US012284269B2

United States Patent
Kostman et al.

(10) Patent No.: US 12,284,269 B2
(45) Date of Patent: Apr. 22, 2025

(54) SYSTEM AND METHOD FOR SECURING COMPUTER CODE USING DYNAMICALLY GENERATED DIGITAL SIGNATURES

(71) Applicant: ProtectedBy.AI, Inc., Reston, VA (US)

(72) Inventors: J T Kostman, Lake Hopatcong, NJ (US); Brian Gallagher, Waterford, VA (US)

(73) Assignee: ProtectedBy.AI, Inc., Reston, VA (US)

( * ) Notice: Subject to any disclaimer, the term of this patent is extended or adjusted under 35 U.S.C. 154(b) by 222 days.

(21) Appl. No.: 17/558,171

(22) Filed: Dec. 21, 2021

(65) Prior Publication Data

US 2022/0200787 A1 Jun. 23, 2022

Related U.S. Application Data

(60) Provisional application No. 63/129,388, filed on Dec. 22, 2020.

(51) Int. Cl.
*H04L 9/06* (2006.01)
*H04L 9/32* (2006.01)

(52) U.S. Cl.
CPC .......... *H04L 9/0643* (2013.01); *H04L 9/0618* (2013.01); *H04L 9/3236* (2013.01); *H04L 9/3247* (2013.01)

(58) Field of Classification Search
CPC ... H04L 9/0643; H04L 9/0618; H04L 9/3236; H04L 9/3247
See application file for complete search history.

(56) References Cited

U.S. PATENT DOCUMENTS

| 11,277,261 | B2* | 3/2022 | Angelo | H04L 9/3239 |
|---|---|---|---|---|
| 2001/0034839 | A1* | 10/2001 | Karjoth | H04L 9/3236 713/176 |
| 2003/0188174 | A1 | 10/2003 | Zisowski | |
| 2008/0134321 | A1 | 6/2008 | Rajagopal et al. | |
| 2009/0199017 | A1* | 8/2009 | Lange | G06F 21/79 713/194 |
| 2010/0106976 | A1 | 4/2010 | Aciicmez et al. | |
| 2012/0117080 | A1 | 5/2012 | Lamanna et al. | |
| 2013/0198838 | A1* | 8/2013 | Schmidt | H04L 63/126 726/22 |
| 2013/0238886 | A1 | 9/2013 | Batke et al. | |
| 2015/0365426 | A1* | 12/2015 | Henocque | G06F 21/64 713/176 |
| 2021/0149663 | A1* | 5/2021 | Zhang | H04L 9/3239 |

OTHER PUBLICATIONS

Patent Cooperation Treaty, International Search Report and Written Opinion issued for PCT Application No. PCT/US2021/064630, dated Mar. 11, 2022, 12 pages.
Yang, J. et al. "Fast Secure Processor for Inhibiting Software Piracy and Tampering," Proceedings of the 36th International Symposium on Microarchitecture, IEEE, Dec. 2003, 10 pages.

* cited by examiner

*Primary Examiner* — Matthew T Henning
(74) *Attorney, Agent, or Firm* — Norton Rose Fulbright US LLP

(57) ABSTRACT

Aspects of the present disclosure provide systems, methods, apparatus, and computer-readable storage media that support securing code by dynamically inserting digital signatures in target code and maintaining the digital signatures in a linked structure (e.g., a blockchain-type structure).

19 Claims, 9 Drawing Sheets

400

```
1.  # [Insert CodeLock Function]
2.
3.  import lorem, ipsum, dolor, sit
4.
5.  def main():
6.
7.      status = 0
8.
9.      try:
10.         opts, args = getopt.getopt(sys.argv[1:], "h:iq",
11.                     ["help","invid=","quarter="])
12.
13. # [Insert CodeLock Function]
14.     except getopt.GetoptError:
15.         usage()
16.     tree = False
17.     for o, a in opts:
18.         if o in ("-h", "--help"):
19.             usage()
20.         if o in ("-i", "--invid"):
21.             invid = str(a)
22.         if o in ("-q", "--quarter"):
23.             quarter = int(a)
24.
25. # [Insert CodeLock Function]
26.
27.     kepid, invid, kepmag, mode, start, stop, release = GetMetaData(invid,quarter)
28.
29. def Greg2JD(year, month, day):
30.
31.     if (month < 3):
32.         y = float(year) - 1.0
33.         m = float(month) + 12.0
34.     else:
35.         y = float(year)
36.         m = float(month)
37.     a = 0; b = 0
38.     if (y + m / 12 + float(day) / 365 > 1582.87100):
39.         a = int(y / 100)
40.         b = 2 - a + int(float(a / 4))
41.     c = 0
42.     if (y < 0.0):
43.         c = int(365.25 * y - 0.75)
44.     else:
45.         c = int(365.25 * y)
46.     d = int(30.6001 * (m + 1))
47.     jd = float(b + c + d + day + 1720994.5);
48.
49.     return jd
50.
51. # [Insert CodeLock Function]
52.
```

*FIG. 4*

SYSTEM AND METHOD FOR SECURING COMPUTER CODE USING DYNAMICALLY GENERATED DIGITAL SIGNATURES

CROSS-REFERENCE TO RELATED APPLICATIONS

The present application claims the benefit of priority from U.S. Provisional Application No. 63/129,388 filed Dec. 22, 2020 and entitled "SYSTEM AND METHOD FOR SECURING COMPUTER CODE USING DYNAMICALLY INSERTED DIGITAL SIGNATURES," the disclosure of which is incorporated by reference herein in its entirety.

TECHNICAL FIELD

The present disclosure relates generally to securing and protecting computer code, and more particularly, to a system and method for ensuring malicious code is not inserted, injected, or otherwise introduced by malicious actors (i.e., hackers) into shared computer code.

BACKGROUND

Malware (a portmanteau of the words "malicious" and "software") has been a persistent and escalating challenge since the first experimental self-replicating virus, Creeper System, was developed in 1971. Perhaps the first computer virus to be publically released, Brain, was developed by Amjad Farooq Alvi and Basit Farooq Alvi in 1986. Brain was ostensibly created to protect medical software developed by the Alvi brothers and to stop people from pirating their product. Unless a valid license number was entered, Brain overwrote the boot sector of floppy disks of users who had pirated copies of the protected medical software. To illustrate, when a user executed a pirated copy of the protected medical software, Brain caused the user's computer to issue a warning and contact information for obtaining a license in order to prevent overwriting of the boot sector—making Brain, arguably, also the first ransomware.

The first computer virus to spread extensively in the wild was developed by Robert Morris, a graduate student from Cornell University, in 1988. The Morris worm was intended to determine the size of the Internet by exploiting security holes in Unix applications, as well as weak passwords. A programming error caused the virus to spread far faster and more broadly than Morris had intended, resulting in the infection of in excess of 15,000 computers in 15 hours—which, in 1988, was most of the Internet.

The explosive growth of malware (e.g., viruses, ransomware, adware, or other types of unwanted code) over the ensuing years has led to circumstances of the present day; a nearly unchecked plague of cybercrime that is costing the global economy approximately $6 trillion annually. To put that in context, the gross domestic product (GDP) of the world's three leading economies—the United States, China, and Japan—are, respectively, $19.48 trillion, $12.23 trillion, and $4.87 trillion (USD). By these measurements, cybercrime has become the world's third largest economy.

SUMMARY

Aspects of the present disclosure provide systems, methods, apparatus, and computer-readable storage media that support dynamically generating specialized 'digital signatures' at predetermined locations (e.g., lines) throughout an entire body of code to create notional containers of code that are then sealed and signed. In some implementations, the digital signatures may be successively linked and stored, such as in a database. In some other implementations, the digital signatures may be inserted into the corresponding blocks of code and then successively linked in a hash chain. Generating such linked digital signatures causes the combination of code and digital signatures to become mutually reinforcing and to create a tamper-proof blockchain-type structure that enables identification of any unauthorized additions, deletions, or changes to the signed code. These security operations may be provided by a lightweight client located between a code repository and one or more computers of an interactive development environment (IDE), thereby securing shared code with minimal changes to typical IDEs.

In a particular aspect, a method for securing computer code from tampering includes receiving, by one or more processors, computer code to be secured. The computer code includes a plurality of code blocks that are sequentially ordered. The method also includes generating, by the one or more processors and based on the computer code, a plurality of hashed signatures that are linked via a sequential ordering. Each hashed signature of the plurality of hashed signatures corresponds to a code block of the plurality of code blocks and is at least partially based on another hashed signature of the plurality of hashed signatures. Generating a first hashed signature of the plurality of hashed signatures includes applying a secure hash function to a representational value corresponding to a first code block of the plurality of code blocks, additional information associated with the first code block, and a prior hashed signature in the sequential ordering of the plurality of hashed signatures. The method further includes outputting, by the one or more processors, the plurality of hashed signatures.

In another particular aspect, a system for securing computer code from tampering includes a memory and one or more processors communicatively coupled to the memory. The one or more processors are configured to receive computer code to be secured. The computer code includes a plurality of code blocks that are sequentially ordered. The one or more processors are also configured to generate, based on the computer code, a plurality of hashed signatures that are linked via a sequential ordering. Each hashed signature of the plurality of hashed signatures corresponds to a code block of the plurality of code blocks and is at least partially based on another hashed signature of the plurality of hashed signatures. Generating a first hashed signature of the plurality of hashed signatures includes applying a secure hash function to a representational value corresponding to a first code block of the plurality of code blocks, additional information associated with the first code block, and a prior hashed signature in the sequential ordering of the plurality of hashed signatures. The one or more processors are further configured to output the plurality of hashed signatures.

In another particular aspect, a non-transitory computer-readable storage medium stores instructions that, when executed by one or more processors, cause the one or more processors to perform operations for securing computer code from tampering. The operations include receiving computer code to be secured. The computer code includes a plurality of code blocks that are sequentially ordered. The operations also include generating, based on the computer code, a plurality of hashed signatures that are linked via a sequential ordering. Each hashed signature of the plurality of hashed signatures corresponds to a code block of the plurality of code blocks and is at least partially based on another hashed signature of the plurality of hashed signatures. Generating a first hashed signature of the plurality of hashed signatures includes applying a secure hash function to a representational value corresponding to a first code block of the plurality of code blocks, additional information associated with the first code block, and a prior hashed signature in the sequential ordering of the plurality of hashed signatures. The operations further include outputting the plurality of hashed signatures.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 4 illustrates an example of modified code that includes insertion of digital signatures according to one or more aspects;

Figure 1:
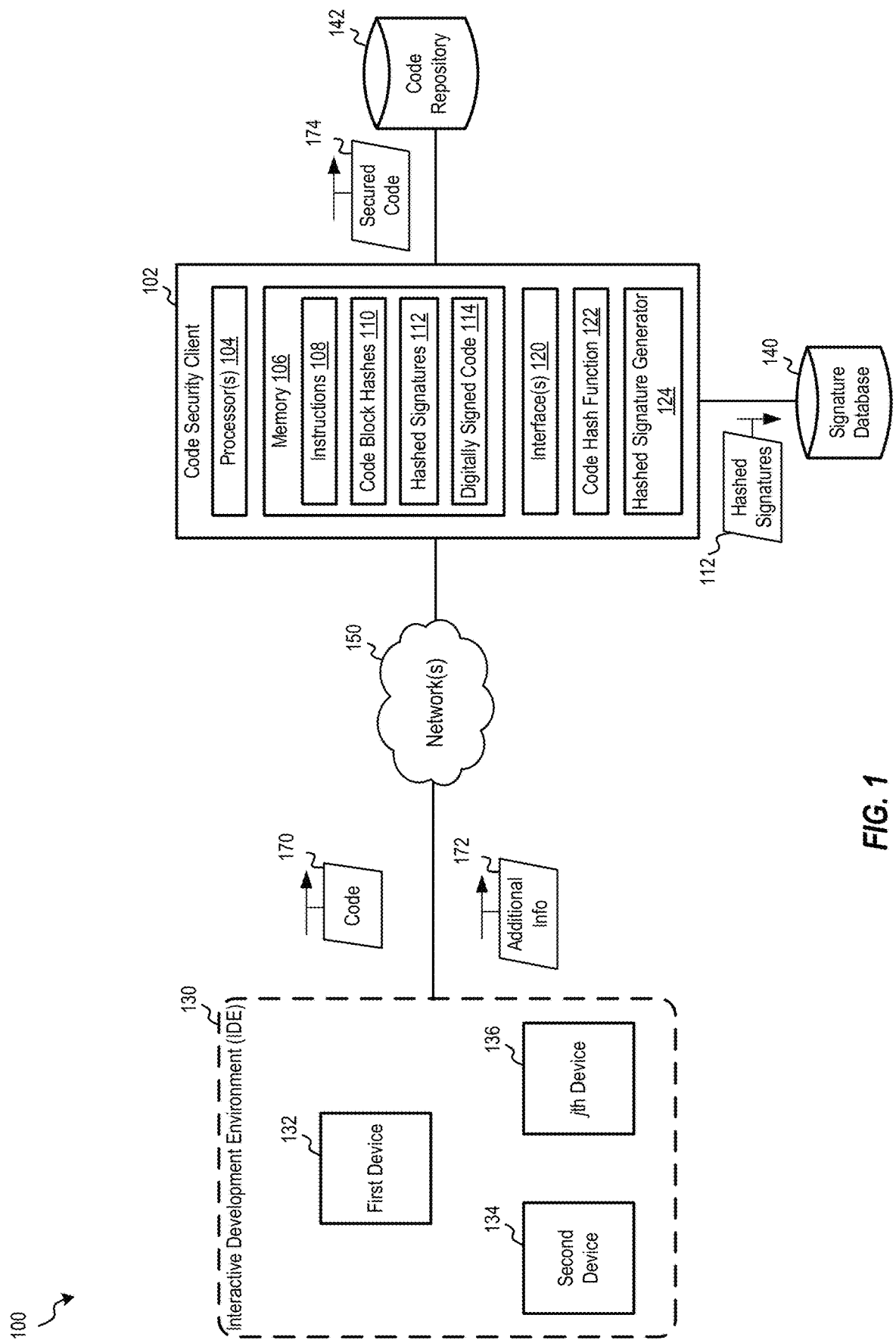
FIG. 1 is a block diagram of an example of a system that secures computer code using dynamic generation of digital signatures according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

The present disclosure describes techniques for protecting computer code and preventing cyberattacks. Cyberattacks typically come in three fundamental forms: Extraction, Obstruction, Insertion. Extraction-oriented cyberattacks focus on theft: the unauthorized removal of data from targeted systems. When the press reports on companies having been "hacked," this is the form of cyberattack (e.g., cybercrime) that is most often being referenced. Extraction cyberattacks use the Internet as an access mechanism to steal electronic or digital assets. Obstruction cyberattacks include distributed denial-of-service (DDoS) attacks in which malicious attempts are made to disrupt normal traffic to a web property, and man-in-the-middle (MitM) attacks in which an attacker intercepts communication between two parties, either to secretly eavesdrop or to modify the traffic traveling between the two parties. Insertion cyberattacks are often the most intrusive and damaging of the three types. These cyberattacks include the unlawful and/or unwelcome introduction of a variety of malware programs (e.g., malicious or unwanted programs), including viruses, worms, spyware, and Trojan horses (and more mundanely, adware). For each type of malware program, the attacker injects computer code into a targeted victim machine to affect a nefarious purpose. The intended objective of malware is to control some or all of the functions of the targeted victim machine, often in furtherance of an extraction attack.

On Dec. 14, 2020, Reuters was the first to report on what has already proven to be the most damaging insertion cyberattack in history. FireEye, a California based cybersecurity company, detected a problem with a product provided to it by SolarWinds—a provider of information technology (IT) monitoring and management tools for System Administrators and Network Engineers. With a customer base of at least 18,000 companies, including 425 of the United States (US) Fortune 500 companies, the top ten US telecommunications companies, the top five US accounting firms, all branches of the US Military, the Pentagon, and the US departments of State, Homeland Security, Commerce and Energy, as well as hundreds of universities and colleges worldwide, SolarWinds was the perfect target for hackers: the quintessential single-point-of-failure nexus for a software supply-chain attack.

The SolarWinds® Orion® platform (SolarWinds and Orion are registered trademarks of SolarWinds Worldwide, LLC of Austin, Texas), versions 2019.4 HF 5 through 2020.2.1 that were released between March 2020 and June 2020, and were ultimately found to contain a trojanized component (i.e., unwanted computer code that enabled entities outside of SolarWinds to access the systems and devices of users that installed and executed the SolarWinds product). Hackers had modified a platform plug-in, SolarWinds.Orion.Core.BusinessLayer.dll, that had been distributed as part of Orion platform updates to include malware. The malware included a "backdoor" that, when executed by the users' systems and devices, communicated with third-party servers controlled by the attackers. According to FireEye, "The malware masquerades its network traffic as the Orion Improvement Program (OIP) protocol and stores reconnaissance results within legitimate plugin configuration files allowing it to blend in with legitimate SolarWinds activity.

The backdoor uses multiple obfuscated blocklists to identify forensic and anti-virus tools running as processes, services, and drivers." The small malware program was disguised and simply hidden within thousands of lines of innocent Orion platform code. This insertion attack was likely intended to facilitate an extraction attack.

Software supply-chain attacks like this are not a new development. Security experts have been warning for many years that software supply-chain attacks are some of the hardest types of cyberattacks to prevent because they take advantage of trust relationships between vendors and customers, and machine-to-machine communication channels, such as software update mechanisms, that are inherently trusted by users. One of the most concerning issues with the SolarWinds hack is that the malware was only detected by a fortunate confluence of circumstances; little more than sheer luck.

The SolarWinds attack completely eluded U.S. security measures and was ultimately discovered not by intelligence officials, but almost accidentally, thanks to an automated security alert sent to an employee at FireEye, which itself had been quietly compromised. The warning, which was also sent to the company's security team, told an employee of FireEye that someone had used his credentials to log into the company's virtual private network from an unrecognized device; the kind of security message most of us routinely ignore. Had that alert not triggered further scrutiny from this one diligent employee, the attack would likely still be undetected.

Charles Carmakal, Senior Vice President of the Incident Response Unit for FireEye, reported that when he received the report of suspicious activity emanating from their own version of SolarWinds' Orion product, he assigned over 100 of the firm's malware analysts and directed them to scour through 50,000 lines of code to search for a proverbial "needle in a stack of needles." The cyber-sleuths eventually spotted a few dozen lines of suspicious code that did not appear to have any reason to be there. Those few dozen lines were, upon further analysis, confirmed to have been the source of the hack. Spotting a few lines of code surreptitiously inserted into a corpus of at least 50,000 lines of similar looking code is less like finding a "needle in a haystack"—and more like finding a single stalk of hay that has been carefully camouflaged to look like every other piece of hay in the stack.

Most disturbingly, this type of hack was not unsurprising or unexpected. In an interview with CSO magazine, David Kennedy, former National Security Agency (NSA) hacker and founder of the security consulting firm TrustedSec, said "When you look at what happened with SolarWinds, it's a prime example of where an attacker could literally select any target that has their product deployed, which is a large number of companies from around the world, and most organizations would have no ability to incorporate that into how they would respond from a detection and prevention perspective. This is not a discussion that's happening in security today." He further stated: "While software that is deployed in organizations might undergo security reviews to understand if their developers have good security practices in the sense of patching product vulnerabilities that might get exploited, organizations don't think about how that software could impact their infrastructure if its update mechanism is compromised." According to Kennedy, "It's something that we're still very immature on and there's no easy solution for it, because companies need software to run their organizations, they need technology to expand their presence and remain competitive, and the organizations that are providing this software don't think about this as a threat model either."

Kennedy believes that a starting point should be with software developers thinking more about how to protect their code integrity at all times, but also thinking of ways to minimize risks to customers when architecting their products. "A lot of times you know when you're building software, you think of a threat model from outside in, but you don't always think from inside out," Kennedy said. "That's an area a lot of people need to be looking at: How do we design our architecture infrastructure to be more resilient to these types of attacks? Would there be ways for us to stop a lot of these attacks by minimizing the infrastructure in the [product] architecture?"

The SolarWinds hack—while more sophisticated than most—is emblematic of the increased capabilities being utilized by cybercriminals. As reported in the Wall Street Journal, "The hackers used the digital equivalent of a spy's disguise to blend in with the flood of data flowing through government and corporate networks and remain undetected. They snatched up years-old but abandoned internet domains and repurposed them for hacking, and they named their software to mimic legitimate corporate tools. Most devastatingly, they sneaked their malicious code into the legitimate software of a trusted software maker."

This intrusion attack is reminiscent of the extraordinary damage done in 2017 when Russian hackers used an obscure Ukrainian tax program as a transmission vector for a Trojan Horse that subsequently metastasized and spread to companies including Merck, Maersk, FedEx, Saint-Gobain, Reckitt Benckiser, and Mondelez, the parent company of Nabisco and Cadbury. The White House approximated this insertion attack, now known as NotPetya, to have caused approximately $10 billion in damages.

The consensus among cybersecurity professionals is that hacks like SolarWinds and NotPetya are little more than the first puffs of an impending tsunami. The worst is yet to come. A Clark School study at the University of Maryland recently reported that a hacker attack now occurs, on average, every 39 seconds. The Federal Bureau of Investigation (FBI) has reported a 300% increase in reported cybercrimes since the beginning of the COVID-19 pandemic. The NSA data center in Utah reportedly experiences as many as 300 million hacking attempts a day.

Hackers engaged in insertion attacks—arguably the most insidious and potentially damaging form of cybercrime—take advantage of the facts that (1) malware can be written in a manner that makes it indistinguishable from the corpus of code into which it is inserted; and (2) commercial software typically relies on thousands to millions of lines of code. Hiding a few lines of camouflaged, innocuous looking malware within massive amounts of otherwise similar looking code makes these "cyber-cancers" virtually impossible to detect.

One basis for the techniques of the present disclosure is consideration of how evidence is secured in the course of a criminal investigation. To illustrate, when a police officer finds a shell casing at the scene of a shooting, procedure dictates the item must be placed in a suitable container, and the container must be sealed and signed. The container must be sufficient to ensure the item cannot be removed without the seal being broken, and the seal also ensures no foreign entity can be introduced and the contents of the container cannot be tampered with.

To achieve similar protections in the realm of cybersecurity, a system and method of the present disclosure (which may be configured to implement one or more cybersecurity algorithms, also referred to herein as "The CodeLock algorithm") may analogously insert specialized 'digital signatures' at predetermined locations (e.g., lines) throughout an entire body of code, or generate a parallel structure of 'digital signatures' that are separately maintained in an accompanying database. These digital signatures are stored and maintained as a linked chain, effectively creating notional containers of code that are then sealed and signed. The digital signatures appended to each code container (or stored in a database or other memory location) may then be successively linked in a hash chain, thereby becoming both mutually reinforcing and creating a tamper-proof blockchain-type structure that may be used to instantly disclose any unauthorized additions, deletions, changes, or corruptions to the protected corpora of code (e.g., the code within the containers).

By incorporating a unique hash value into the digital signature, if even one character contained within a block of code is changed in any way, the hash value changes—and the block becomes flagged as reporting an incorrect value based on the changed hash value. By dynamically generating hash values and appending them to each block of code or otherwise storing them in a blockchain-type structure—and incorporating the function call for doing so within the corpus of code being hashed—it may become impossible for hackers or other malicious entities, even if they are somehow able to divine and forge a digital signature that appears genuine, to insert that static, forged line of code in place of the proper function. Because the function call for the digital signature function becomes a part of the generated hash value (e.g., the hashed value is based at least in part on the function call for the digital signature), the generated hash value is inextricably linked to the contents of the container of code, the hash value from a preceding block, and the function call. If any changes are made to any of these three elements, the hash value becomes corrupted and is revealed as having been tampered with. The digital signatures may be inserted into the code as comments, effectively rending the digital signatures invisible to the flow of the program into which the digital signatures are embedded, or may be stored outside of the code for retrieval when validating received code. In this manner, the embedded digital signatures (or the stored digital signatures) do not interfere with the operation of the underlying code, and the digital signatures effectively operate as a meta-program that wraps the functional codebase.

While digital signatures have historically been limited by their reliance on a trusted intermediary, the techniques of the present disclosure may emulate several of the features that make blockchain algorithms so formidable and have led to their widespread adoption. As particular examples, the system of the present disclosure may implement blockchain features in order to support the successive linking of dynamically generated hash values and a publicly disclosable interface for reporting the digital signatures, which may result in decentralization, immutability, trustless security, and transparency for the protected code.

A system in accordance with one or more aspects of the present disclosure may include a computing device that is configured to dynamically generate digital signatures at particular locations within target code (e.g., by dividing the target code into multiple code blocks) and to successively link the digital signatures in a blockchain-type structure. The computing device includes one or more processors, and a memory coupled to the one or more processors. The memory may store instructions that, when executed by the one or more processors, cause the one or more processors to perform the functionality (e.g., the method) described herein. In some implementations, the computing device may include a desktop computer, a laptop computer, a server, a mobile device (e.g., a smart phone, a tablet device, a "wearable", or the like), an "Internet-of-Things" (IoT) device, a media playback device, an entertainment device, a vehicle (or a component thereof), a software distribution platform or node, an intermediate network device, an endpoint device, another type of computing device, or a combination thereof. Although described as being performed by a computing device, in some other implementations, the operations of the computing device may be performed by multiple devices in a distributed configuration, such as a cloud-based software development system.

In some implementations, the computing device may be configured to dynamically insert digital signatures at particular locations within target code (e.g., software). In some such implementations, the computing device may be configured to generate the target code (e.g., as part of a software development process). Alternatively, the computing device may receive or access the target code from another device, such as a code database or repository. The computing device may modify the target code by inserting function calls to generate digital signatures that are linked in a blockchain-type structure (e.g., a hash chain) at particular locations within or in parallel with the target code. For example, if the target code includes 20 lines of code and the computing device is configured to insert digital signatures after every 10 lines of code, the computing device may insert a first digital signature function call at line 0, then a second after line 10 of the target code and a third digital signature function call after line 20 of the target code. In this example, the first digital signature function call may be configured to enable generation of a first digital signature (e.g., a first hash value), then a second digital signature based on a combination of lines 1-10 of the target code and the first two digital signature function calls, and the third digital signature function call may be configured to enable generation of a third digital signature (e.g., a second hash value) based on a combination of lines 11-20 of the target code, the third, second, and first digital signature function calls. Additional digital signature function calls may be similarly inserted in target code that includes more than 20 lines of code. In other implementations, the digital signature function calls may be inserted at other predefined locations within the target code, such as after every 50 lines of code, after every 100 lines of code, after any particular number of lines of code, after particular lines of code, such as object definitions, class definitions, functions, loops, function calls, or the like.

In some other implementations, instead of inserting the digital signatures into the underlying code, the digital signatures may be generated, linked, and stored outside of the underlining code, such as at a database or other storage location. Thus, the underlying code is divided into multiple code blocks, and a digital signature is generated for each code block. In the example described above, a first code block may include lines 1-10 and a second code block may include lines 11-20, and a first digital signature for the first code block may be generated based on lines 1-10, related information, and an initial signature value. Similarly, a second digital signature for the second code block may be generated based on lines 11-20, related information, and the first digital signature. Because each digital signature is based at least partially on a digital signature of a prior code block, the digital signatures are linked as a hash chain, and can be stored at a database for retrieval and comparison when validating received code.

After modifying the target code, the computing device may execute the modified target code to generate a set of one or more digital signatures, and the computing device may distribute the modified target code and the set of digital signatures to enable receiving devices that receive the modified target code to verify that the target code has not been tampered with by an outside entity. For example, if digital signatures generated by a receiving device based on received code do not match the digital signatures received from the computing device (or stored at another location, such as a signature database), the receiving device may determine that the received code has been tampered with, and the receiving device may perform one or more operations such as alerting a user, quarantining the received code, requesting a copy of the received code from a different source, or the like. Thus, the computing device enables securing of code (e.g., software) from Insertion attacks in a decentralized and transparent manner.

In some implementations, the signed data structures are append-only, such that the data (e.g., code) contained within each code block cannot be altered or deleted. For example, a block of code (e.g., one or more lines of code) may be followed by a digital signature function call that causes generation of a digital signature based at least in part on the block of code. Because the digital signature is based at least in part on the block of code at the time of generation of the digital signature, any subsequent alterations to the block of code, such as modifications, additions, or deletions, will result in generation of a different digital signature that will not match the originally-generated digital signature associated with the secure code.

In some implementations, the digital signatures are dependent on subsequently completed blocks to complete the amalgamated process, thereby creating an interlinked inviolable chain of digital signatures. For example, a digital signature for a particular block of code may be based on the particular block of code, the digital signature function call, a digital signature of a previous block, and optionally a secondary digital signature (e.g., secondary hash value) based on an entirety of the code that includes the particular block of code. Thus, the digital signatures may form a blockchain-type structure in which each digital signature is linked to other digital signatures, thereby resulting in secure and immutable entries similar to a blockchain.

In some implementations, the computing device (e.g., one or more platforms that support the cybersecurity techniques described herein) are amenable to operating as a distributed ledger for storing or providing the digital signatures, which may enable the incorporation of Byzantine fault tolerance (BFT) and a secure consensus protocol to ensure continuous integrity of digital signatures. BFT is a feature commonly used within some distributed networks to ensure consensus (e.g., agreement on the same value) even in incidents in which one or more nodes in the network fail to respond or respond with incorrect or inconsistent information. The objective of a BFT mechanism is to safeguard against system failures by employing collective decision making (i.e., consensus) on both correct and faulty values, which may thereby ensure fraudulent digital signatures are not approved by a single actor, either unintentionally or in furtherance of corrupt purposes. Additionally, or alternatively, all code contained within each code block cannot be altered, nor can code blocks be surreptitiously deleted, inserted, or swapped, without resulting in digital signatures (e.g., hash values) that do not match the digital signatures of the distributed ledger.

In some implementations, the techniques described herein integrate nonrepudiation by ascribing verifiable credentials to all users authorized to update, change, or otherwise modify any aspect of an overall corpus, or any constituent corpora, of code. For example, any creation or modification of code may be signed based at least in part on credentials of the user responsible for the creation or modification, thereby providing transparency and nonrepudiation of authors of the code.

In some implementations, the digital signatures may be coded to incorporate date and/or time stamps, such as a date and time that code is signed (e.g., the digital signature is generated). Additionally, or alternatively, the digital signatures may also incorporate any relevant provenance information through referenced records or obtained in the course of developing the digital signature (e.g., browser and configuration information, user-agent string, clock information, web browser plugins, Transmission Control Protocol (TCP) stat variation, installed fonts on an initiating device, JavaScript objects, internal application programming interfaces (APIs), device information such as screen resolution, touch support, operating system (OS) and language, flash data, a list of mime-types, cascading style sheets (CSS) information, hypertext transfer protocol (HTTP) headers, geographical provenance derived from the initiating device, internet protocol (IP) addresses, and/or media access control (MAC) addresses). To illustrate, a user interface (UI) that is configured to collect and report digital signatures, as further described herein, may access a record based on the digital signature (e.g., the digital signature operates as or includes a reference number associated with the record) to retrieve additional information associated with a signed code block, information associated with the digital signature, other information, or a combination thereof.

In some implementations, the techniques described herein support verification without dependence on third parties, thereby increasing security and reducing or negating the possibility of interception and man-in-the-middle (MitM) attacks. For example, digital signatures associated with software may be provided to all recipients to enable verification of the authenticity of the software by the recipients. Additionally, or alternatively, the system described herein may utilize a decentralized platform (e.g., decentralized securing and storing of code), which may provide instantaneous/near-instantaneous vetting capabilities to an unlimited number of authorized users.

In some implementations, the digital signatures of the present disclosure support configurable layers of transparency. For example, authorized users can be provided with access to the underlying codebase, the digital signature, and/or a binary yes/no report on the integrity of digital signature matches. The information provided to each user may be based on the user's authorization level or credentials, thereby supporting configurable transparency to different types of users.

In some implementations, the system described herein enables instant (e.g., real-time or near-real-time) and continuous auditability. For example, discrepancies between the distributed digital signatures and digital signatures generated by one or more nodes may be identified upon receipt of the code and generation of the digital signatures at the one or more nodes. The chaining nature of the digital signature structure may instantly disclose nodes along the chain which have been corrupted (e.g., received code which has been tampered with, resulting in different digital signature(s)).

In some implementations, the system described herein supports a 'smart contract' capability, which can be incorporated into business processes and procedures. For example, similar to blockchains, the digital signature data structure utilized by the system operates as a 'Smart Contract' by enabling secure and transparent sharing of digital signatures that are immutable once added to the digital signature data structure.

In some implementations, cybersecurity functionality described herein with respect to the computing device may be implemented or delivered as one or more algorithms that are directly incorporated into code through a function, a library, a method, or the like; as a feature offered through an interactive development environment (IDE); as a stand-alone application (e.g., a software security or development and distribution application); via other implementations, or a combination thereof. The algorithms, IDE, application, or the like, may be configured for execution at a user device or in a distributed system (e.g., functionality at user devices may be supported by execution at a server or cloud-based system, as a non-limiting example).

Referring to FIG. 1, an example of a system that secures computer code using dynamic generation of digital signatures according to one or more aspects is shown as a system 100. The system 100 may be configured to dynamically generate particular digital signatures and to link the digital signatures to form a hash chain, thereby creating a tamper-proof blockchain-type structure that enables identification of any unauthorized additions, deletions, or changes to secure code, such as by hackers or other malicious entities. As shown in FIG. 1, the system 100 includes a code security client 102, an interactive development environment (IDE) 130 that includes a first device 132, a second device 134, and a jth device 136, a signature database 140, a code repository 142, and one or more networks 150. In some implementations, one or more of the devices 132-136, the signature database 140, and the code repository 142 may be optional, or the system 100 may include additional components.

The code security client 102 is a device that is configured to secure code, such as via execution of a lightweight code security client application, using dynamic generation of digital signatures (also referred to herein as hashed signatures). For example, the code security client 102 may include or correspond to a computing device, a desktop computing device, a laptop computing device, a personal computing device, a tablet computing device, a server, a mobile device (e.g., a smart phone, a tablet, a personal digital assistant (PDA), a wearable device, and the like), a virtual reality (VR) device, an augmented reality (AR) device, an extended reality (XR) device, a vehicle (or a component thereof), an entertainment system, other computing devices, or a combination thereof, as non-limiting examples. The code security client 102 includes one or more processors 104, a memory 106, one or more communication interfaces 120, a code hash function 122, and a hashed signature generator 124. In some other implementations, one or more of the code hash function 122 and the hashed signature generator 124 may be optional, one or more additional components may be included in the code security client 102, or both. It is noted that functionalities described with reference to the code security client 102 are provided for purposes of illustration, rather than by way of limitation and that the exemplary functionalities described herein may be provided via other types of computing resource deployments. For example, in some implementations, computing resources and functionality described in connection with the code security client 102 may be provided in a distributed system using multiple servers or other computing devices, or in a cloud-based system using computing resources and functionality provided by a cloud-based environment that is accessible over a network, such as the one of the one or more networks 150. To illustrate, one or more operations described herein with reference to the code security client 102 may be performed by one or more servers or a cloud-based system that communicates with one or more client or user devices, such as the devices 132-136 of the IDE 130. Alternatively, one or more operations described as being performed by the code security client 102 may instead be performed by one or more of the devices 132-136 or another user device.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the code security client 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the code security client 102 may be stored in the memory 106 as instructions 108 that, when executed by the one or more processors 104, cause the one or more processors 104 to perform the operations described herein with respect to the code security client 102, as described in more detail below. Additionally, the memory 106 may be configured to store data and information, such as code block hashes 110, hashed signatures 112, and, optionally, digitally signed code 114. Illustrative aspects of the code block hashes 110, the hashed signatures 112, and the digitally signed code 114 are described in more detail below.

The one or more communication interfaces 120 (e.g., one or more network interfaces) may be configured to communicatively couple the code security client 102 to the one or more networks 150 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the code security client 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the code security client 102. In some implementations, the code security client 102 is coupled to a display device, such as a monitor, a display (e.g., a liquid crystal display (LCD) or the like), a touch screen, a projector, a VR display, an AR display, an XR display, or the like. In some other implementations, the display device is included in or integrated in the code security client 102, or the code security client 102 is configured to send information for display to an external device, such as one or more of the devices 132-136 of the IDE 130.

The code hash function 122 is configured to generate representational values, such as hash values, based on computer code or portions thereof (e.g., code blocks). For example, the code hash function 122 may include or correspond to one or more types of secure hash functions, such as Secure Hash Algorithm 224 (SHA-224), SHA-256, SHA-384, SHA-512, SHA-3, a spectral hash, a Merkle tree-based hash, or RIPE Message Digest 320 (RIPEMD-320), as non-limiting examples. In some implementations, the code hash function 122 may be selected or configured to generate hash values having a particular size that condenses a memory footprint as compared to storing an entirety of the code or code block from which the hash value is generated.

The hashed signature generator 124 is configured to generate digital signatures, also referred to herein as hashed signatures, based on representational values (e.g., hash values) derived from code blocks, specific information associated with the code blocks (e.g., timestamps, author information, file information, security data, and the like), and at least one other hashed signature. The hashed signature generator 124 may be configured to apply a hash function, also referred to as a "CodeLock function" to generate a hashed signature (e.g., a "CodeLock signature") that represents a corresponding code block at the time of generation of the digital signature, such that the code block becomes immutable with reference to the hashed signature. For example, any modification to the code block after generation of the digital signature will result in generation of a different digital signature after the modification, which will cause the code block to fail validation and an alert to be generated, as further described herein. In some implementations, the hash function applied by the hashed signature generator 124 includes or corresponds to SHA-224, SHA-256, SHA-384, SHA-512, SHA-3, a spectral hash, a Merkle tree-based hash, RIPEMD-320, or the like. The generated digital signatures may be used to sign the corresponding code blocks, such as by insertion of the digital signatures into the code blocks themselves or storage of the digital signatures for use in later validation operations. Because each digital signature is based at least partially on one or more other digital signatures, the digital signatures are linked to form a hash chain (e.g., a blockchain-type structure) where each digital signature secures not only the corresponding block of code, but all prior blocks of code in computer code to be secured.

The IDE 130 may include one or more computing devices that are configured to generate code (or code blocks) for storage in the code repository 142 and sharing with other devices for programming, debugging, or execution. In the example shown in FIG. 1, the IDE 130 includes the first device 132, the second device 134, and the jth device 136. In other implementations, the IDE 130 may include fewer than three or more than three devices (i.e., j may be any integer). The devices 132-136 may include computing devices, such as desktop computing devices, laptop computing devices, personal computing devices, tablet computing devices, servers, mobile devices (e.g., smart phones, tablets, PDAs, wearable devices, and the like), VR devices, AR devices, XR devices, vehicles (or component(s) thereof), entertainment systems, other computing devices, or a combination thereof, as non-limiting examples. The devices 132-136 may include processors and memories that store instructions that, when executed by the processors, cause the processors to perform the operations described herein, similar to the code security client 102. The devices 132-136 may also include or be coupled to display devices configured to display graphical user interfaces (GUIs) to support code development, to validate code, or both. In some implementations, one or more devices of the IDE 130 may be at different locations, and the devices of the IDE 130 may be communicatively coupled by one or more internal networks, the one or more networks 150, or a combination thereof.

The signature database 140 is configured to store digital signatures generated by the code security client 102. In some implementations, the signature database 140 is external to the code security client 102 and accessible via a network or other communication link. For example, the signature database 140 may include or correspond to a network database, a database integrated in the server, a cloud storage location, or the like. Although illustrated in FIG. 1 as being external to the code security client 102, in some other implementations, the signature database 140 may be included in or integrated in the code security client 102, such as being stored in the memory 106 or another storage location within the code security client 102.

The code repository 142 is configured to store computer code, such as software, applications, or the like, in whole or in portions (e.g., as code blocks). The code repository 142 may be communicatively coupled to the devices of the IDE 130, such as via the one or more networks 150, to enable storage and retrieval of computer code by one or more of the first device 132, the second device 134, and the jth device 136. For example, the code repository 142 may be hosted by a server, an external database, a cloud storage provider, or the like. In some implementations, the code repository 142 may be configured to support versioning, updating, retrieval, secure storage, and other operations or functionality with respect to computer code. Although shown as distinct storage locations in FIG. 1, in some other implementations, the signature database 140 and the code repository 142 may be combined in a single storage location (e.g., computer code and digital signatures may be stored at the same database or other storage location).

During operation of the system 100, user(s) (e.g., programmers) of the IDE 130 may generate, modify, and initiate storage of code 170 at the code repository 142. For example, one or more of the first device 132, the second device 134, and the jth device 136 may generate the code 170 (e.g., an application, software, etc.) and send the code 170 to the code repository 142 for storage. In some implementations, the IDE 130 (e.g., one or more of the devices 132-136) may include additional information 172 with the code 170 or in a separate transmission, or the code security client 102 may request the additional information 172 upon receipt of the code 170. The additional information 172 includes information related to the code 170, author(s) (e.g., user(s)) that generated the code 170, security data associated with the code 170 or the IDE 130, other information, or a combination thereof. As non-limiting examples, the additional information 172 may include one or more timestamps associated with the code 170, user information associated with a user that authored the code 170, credentials associated with the user, security data associated with the code 170 or the user, or the like. As other examples, the additional information 172 may include any relevant provenance information generated through referenced records or obtained in the course of developing a hashed signature, such as browser and configuration information, user-agent strings, clock information, web browser plugins, Transmission Control Protocol (TCP) stat variation, installed fonts on one of the devices 132-136, JavaScript objects, internal application programming interfaces (APIs), device information for the devices 132-136 (e.g., screen resolution, touch support, operating system (OS), language, etc.), flash data, a list of mime-types, cascading style sheets (CSS) information, hypertext transfer protocol (HTTP) headers, geographical provenance derived from the devices 132-136, internet protocol (IP) addresses, media access control (MAC) addresses, other information, or a combination thereof. In some implementations, the additional information 172 may be different for different portions of code. For example, if the code 170 includes a first portion generated by a first user at the first device 132 and a second portion generated by a second user of the second device 134, the additional information 172 may include a first timestamp corresponding to generation of the first portion, first user credentials associated with the first user, first security data generated by the first device 132, a second timestamp corresponding to generation of the second portion, second user credentials associated with the second user, and second security data generated by the second device 134.

The code security client 102 may receive the code 170 and the additional information 172 and may generate the hashed signatures 112 (e.g., a plurality of digital signatures) based on the code 170 and the additional information 172. Although described as generating the hashed signatures 112 based on the additional information 172 (or portions thereof), the additional information 172 is optional, and in some other implementations, the additional information 172 is not used to generate the hashed signatures 112. The hashed signatures 112 may be linked via a sequential ordering, such that the hashed signatures 112 form a hash chain. For example, each hashed signature of the hashed signatures 112 (except for an initial hashed signature) may be based at least partially on another hashed signature (e.g., a hashed signature that is associated with a code block that is prior to a corresponding code block in the code 170) of the hashed signatures 112. To illustrate, the code security client 102 may segment the code 170 into multiple blocks of code that, when sequentially ordered, combine to form the code 170. A size of each code block may be predetermined and programmed at the code security client 102, or the size of the code blocks may be dynamically determined based on one or more properties of the code 170, such as a file size or number of lines, a priority or security setting associated with the code 170, other properties, or a combination thereof. As a non-limiting example, the code 170 may include fifty lines of code, and the code security client 102 may segment the code 170 into five code blocks each including ten lines of code.

The code security client 102 may provide each code block, as well as additional information, to the hashed signature generator 124 to generate one of the hashed signatures 112 for each of the code blocks. For example, a first hashed signature of the hashed signatures 112 may be generated by the hashed signature generator 124 applying a secure hash function (e.g., the CodeLock function) to a representational value corresponding to the first code block, a portion of the additional information 172 that corresponds to the first code block, and a prior hashed signature in the sequential ordering of the hashed signatures 112. In the example of the first hashed signature, the prior hashed signature is generated based on one or more null values, as further described herein with reference to FIG. 6. After generating the first hashed signature, the hashed signature generator 124 may apply the secure hash function to the first hashed signature, a representational value of the second code block, and a portion of the additional information 172 that corresponds to the second code block to generate a second hashed signature of the hashed signatures 112. The remaining code blocks may be leveraged in this manner to generate additional hashed signatures of the hashed signatures 112 (e.g., one for each of the remaining code blocks). In some implementations, an additional hashed signature may be generated based on an entirety of the code 170 after each of the other hashed signatures 112 are generated. In this manner, each of the hashed signatures 112 is based at least partially on a prior hashed signature in the hash chain formed by the hashed signatures 112, thereby forming a blockchain-type structure that secures and enables identification of modifications to each corresponding code block (and any prior code blocks in the code 170).

In some implementations, the representational values correspond to hash values (e.g., the code block hashes 110) are generated based on the code blocks. For example, the first representational value corresponding to the first code block may include or correspond to a first hash value of the code block hashes 110 that is generated by the code hash function 122 based on the first code block, and the second representational value corresponding to the second code block may include or correspond to a second hash value of the code block hashes 110 that is generated by the code hash function 122 based on the second code block. To further illustrate, the code security client 102 may provide the first code block for application of the code hash function 122 (e.g., a SHA-256 or SHA-512 function, as non-limiting examples) to generate the first hash value, and the code security client 102 may provide the second code block for application of the code hash function 122 to generate the second hash value. Although described as applying the code hash function 122 to each code block, in some other implementations, the code hash function 122 may be applied to portions of the code blocks, to combinations of the code blocks (or portions thereof) and other information (e.g., portions of the additional information 172), or the like, to generate the representational values of the code blocks. The outputs of the code hash function 122 (e.g., the code block hashes 110) may be provided as inputs to the hashed signature generator 124 along with the additional information 172 and the hashed signatures 112 as they are generated in order to generate subsequent ones of the hashed signatures 112. Alternatively, the representational values may be based on properties associated with the code blocks (e.g., portions of the additional information 172) and not the code blocks themselves, in some implementations.

In some implementations, to enable generation of the hashed signatures 112, the code security client 102 may insert a digital signature function call (e.g., a hashed signature function call/CodeLock function call) in each of the code blocks of the code 170 prior to generating the hashed signatures 112. For example, the code security client 102 may insert a function call to a secure hash function (e.g., a function call to be performed by the hashed signature generator 124) in a particular line of each code block, such as a last line, a middle line, a first line, or any other line that is the same for each code block. Because the function calls are inserted prior to generation of the hashed signatures 112, the hashed signatures are based on the function calls (e.g., the code block hashes 110 are hash values of the code blocks of the code 170 and the function call). An example of inserting function calls is illustrated and described with reference to FIG. 4.

After generating the hashed signatures 112, the code security client 102 may output the hashed signatures 112, secured code 174, or both. In some implementations, outputting the hashed signatures 112 includes storing the hashed signatures 112 at the signature database 140. For example, the code security client 102 may send the hashed signatures 112 (which together form a linked hash chain) to the signature database 140 for storage, and eventual retrieval during validation operations. In some such implementations, the code security client 102 generates the secured code 174 by inserting the hashed signature function calls into the code 170, and the secured code 174 is provided to the code repository 142 for storage. Alternatively, the code security client 102 may output the hashed signatures 112 by inserting the hashed signatures 112 themselves into the code 170, along with the hashed signature function calls, to generate the secured code 174. The secured code 174 may then be stored at the code repository 142 (with or without storing the hashed signatures 112 at the signature database 140). Inserting hashed signatures into code is further described herein with reference to FIGS. 3-4.

In some other implementations, neither the hashed signature function calls nor the hashed signatures are inserted into the code 170, and instead the hashed signature generation is managed outside of (e.g., in parallel to) the code 170. To illustrate, the code 170 may be provided with no modifications as the secured code 174, and the size of the code blocks, the location of where hashed signature function calls would be in the code 170, or other hashed signature related information may be generated and maintained by the code security client 102 without making any modifications to the code 170. In some such implementations, these code block and hashed signature parameters may be stored together with the hashed signatures 112 at the signature database 140, or at any other storage location, such as the memory 106, a storage device, a server, a cloud storage service, or the like. The code block and hashed signature parameters may be retrieved for use during validation of computer code, as further described herein with reference to FIG. 2.

As described above, the system 100 supports securing computer code using dynamically generated digital signatures (e.g., hashed signatures). For example, the code security client 102 may generate the hashed signatures 112 based on the code 170, and the hashed signatures 112 may be stored (e.g., at the signature database 140) or inserted into the code 170 to enable validation at a later time that the code 170 has not been modified. The hashed signatures 112 may be linked to form a hash chain by generating each of the hashed signatures 112 based on at least one other hashed signature (e.g., a hashed signature corresponding to a prior code block in a sequence of code blocks that make up the code 170). Generating such linked digital signatures causes the combination of the secured code 174 and the hashed signatures 112 to become mutually reinforcing and to create a tamper-proof blockchain-type structure that enables identification of any unauthorized additions, deletions, or changes to the secured code 174. These security operations may be provided by a lightweight client (e.g., the code security client 102) located between the code repository 142 and the IDE 130, thereby securing shared code with minimal changes to typical IDEs. The secured code 174 may be validated, as further described herein with reference to FIG. 2.

Figure 2:
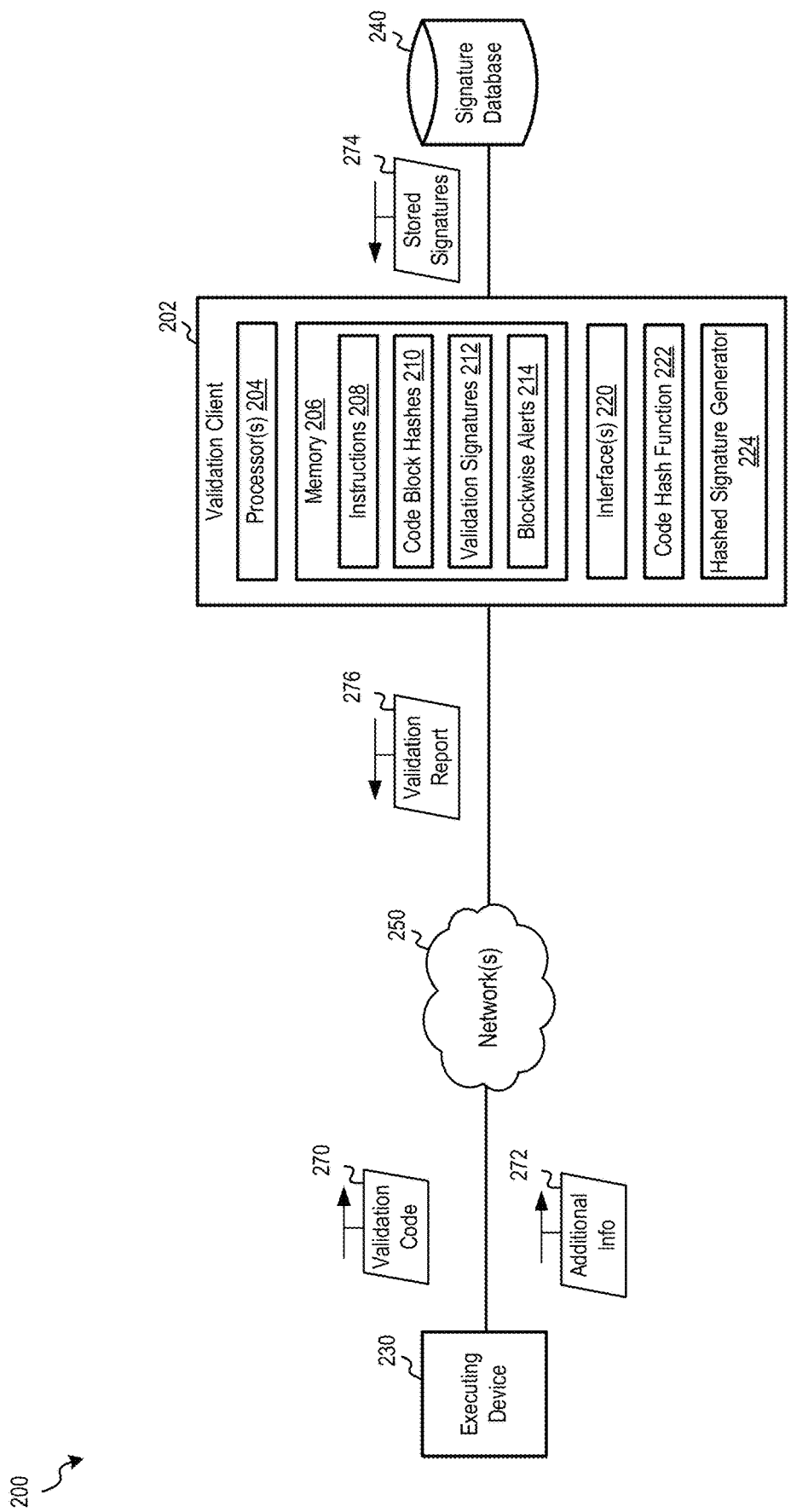
FIG. 2 is a block diagram of an example of a system that validates computer code secured by digital signatures according to one or more aspects.

Referring to FIG. 2, an example of a system 200 that validates computer code secured by digital signatures according to one or more aspects is shown as a system 200. In some implementations, the secured computer code may be secured according to one or more aspects described above with reference to the system 100 of FIG. 1. As shown in FIG. 2, the system 200 includes a validation client 202, an executing device 230, a signature database 240, and one or more networks 250. The signature database 240 and the one or more networks 250 may include or correspond to the signature database 140 and the one or more networks 150 of FIG. 1, respectively. The executing device 230 may include a computing device that receives code to be executed, such as from the code repository 142 of FIG. 1. For example, the executing device 230 may include computing devices, such as a desktop computing device, a laptop computing device, a personal computing device, a tablet computing device, a server, a mobile device (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. In some implementations, the executing device 230 may include or correspond to one of the devices 132-136 of the IDE 130 of FIG. 1.

The validation client 202 may be configured to receive code to be validated and to perform one or more validation operations to validate that the code has not been tampered with since a particular time (e.g., a time the code is secured as described with reference to FIG. 1). The validation client 202 may include or correspond to a computing device, a desktop computing device, a laptop computing device, a personal computing device, a tablet computing device, a server, a mobile device (e.g., a smart phone, a tablet, a PDA, a wearable device, and the like), a VR device, an AR device, an XR device, a vehicle (or a component thereof), an entertainment system, other computing devices, or a combination thereof, as non-limiting examples. In some implementations, the validation client 202 may include or correspond to the code security client 102 of FIG. 1. The validation client 202 may include one or more processors 204, a memory 206, one or more interfaces 220, a code hash function 222, and a hashed signature generator 224, which may include or correspond to the one or more processors 104, the memory 106, the one or more communication interfaces 120, the code hash function 122, and the hashed signature generator 124 of FIG. 1, respectively. The memory 206 may be configured to store instructions 208 and data or information, such as code block hashes 210, validation signatures 212 (e.g., hashed signatures), and blockwise alerts 214, which are described in further detail herein.

During operation of the system 200, the executing device 230 may send validation code 270 (e.g., code to be validated) to the validation client 202. The validation code 270 may represent computer code that has been obtained by the executing device 230 to be executed, and that was previously secured (e.g., by the code security client 102 of FIG. 1). The executing device 230 may also send additional information 272 to validation client 202, either as part of the same transmission as the validation code 270 or as a separate transmission. The additional information 272 includes information related to the validation code 270, similar to the additional information 172 described with reference to FIG. 1. Although shown as being sent to the validation client 202 by the executing device 230, in some other implementations, the validation client 202 may be located between the executing device 230 and a code repository (e.g., the code repository 142 of FIG. 1), and the validation client 202 may receive the validation code 270 from the code repository as part of a retrieval operation for providing the validation code 270 to the executing device 230. Additionally, or alternatively, the operations described with reference to the validation client 202 may be performed by the executing device 230 in some implementations.

After receiving the validation code 270, the validation client 202 may segment the validation code into multiple code blocks that are sequentially ordered to make up the validation code 270. In some implementations, hashed signature function calls have been previously inserted into the validation code 270, and the code blocks may be divided according to the hashed signature function calls. Alternatively, code block and hashed signature parameters may be retrieved from the signature database 240, either by the validation client 202 or the executing device 230, and the validation code 270 may be divided based on the retrieved parameters (e.g., code block sizes, number of code blocks, locations for hashed signature function calls, etc.). To validate the validation code 270, the validation client 202 may generate a validation signature (e.g., a hashed signature/digital signature) based on the validation code 270 and the additional information 272 (or a portion thereof), and the validation client 202 may retrieve stored signatures 274 (e.g., e.g., the hashed signatures 112 stored during the operations described with reference to FIG. 1) for use in generating the validation signature and for comparing to the validation signature. Although described as being based on the additional information 272 (or portions thereof), the additional information 272 is optional, and in some other implementations, the validation signature is generated without using the additional information 272. In some implementations, because of the stored signatures 274 for a hashed chain, the validation code 270 may be validated if a validation signature corresponding to a last code block matches a last hashed signature of the stored signatures 274. This is due to the linking of the hashed signatures and validation signatures in the hashed chains, such that the last validation signature is based on (and therefore linked to) each previous validation signature in the hashed chain, and as such, if any of the code blocks are tampered with after generation of the stored signatures 274, that tampering will be reflected in a validation signature for the last code block of the validation code 270 that does not match a last hashed signature of the stored signatures 274.

To support the validation process, the validation client 202 may generate a validation signature for each code block of the validation code 270, similar to as described above for generating the hashed signatures of FIG. 1. As an illustrative example, the validation client 202 may provide the last code block of the validation code 270 to the code hash function 222 to generate a representational value (e.g., one of the code block hashes 210) that corresponds to the last code block. The validation client 202 may provide the representational value of the last code block, a portion of the additional information 272 that corresponds to the last code block, and a prior validation signature in the sequential ordering of validation signatures (e.g., a second-to-last validation signature) as inputs to the hashed signature generator 224 to generate a first validation signature (e.g., a hashed signature corresponding to the last code block of the validation code 270) of the validation signatures 212. As described with reference to FIG. 1, the hashed signature generator 224 is configured to generate a hashed signature by applying a particular hash function (e.g., a CodeLock function) to the inputs to generate a hashed signature that is based at least partially on another hashed signature.

After generating the first validation signature of the validation signatures 212, the validation client 202 may determine whether to issue an alert based on a comparison of the first validation signature to the last hashed signature of the stored signatures 274. If the first validation signature matches the last hashed signature, the validation code 270 is the same as the secured code when the stored signatures 274 were generated, and thus the validation code 270 has not been tampered with. Based on a determination that the first validation signature matches the last hashed signature, the validation client 202 may determine not to issue an alert and to output validation of the validation code 270. Alternatively, if the first validation signature does not match the last hashed signature, the validation code 270 is not the same as the secured code when the stored signatures 274 were generated, and thus the validation code 270 has been modified. Based on a determination that the first validation signature does not match the last hashed signature of the stored signatures 274, the validation client may issue an alert to indicate that the validation code 270 is not validated, and therefore has been modified after generation of the stored signatures 274. The alert may be a first alert of the blockwise alerts 214.

In some implementations, based on a determination that the validation code 270 has been modified, the validation client 202 may iteratively perform validation on each remaining block of code of the validation code 270 until a determination of a valid code block. Because the validation code 270 can be analyzed on a blockwise (e.g., block-by-block) basis, a first code block that has been modified may be determined by identifying the code block that is subsequent to a code block that is valid (e.g., that corresponds to a validation signature that matches the related hashed signature of the stored signatures 274). To illustrate, the validation client 202 may provide a second-to-last code block of the validation code 270 to the code hash function 222 to generate a second representational value (e.g., a second hash value of the code block hashes 210), and the validation client 202 may provide the second representational value, a portion of the additional information 272, and a third-to-last validation signature as inputs to the hashed signature generator 224 to generate a second validation signature. This process may occur before generation of the first validation signature (e.g., the validation signatures 212 may be generated in order). If the second validation signature matches the second-to-last hashed signature of the stored signatures 274, only the last code block has been modified. If the second validation signature does not match the second-to-last hashed signature, the validation client may continue to validate the next code block until identifying a code block that results in a validation signature that matches a corresponding hashed signature of the stored signatures 274, or until all of the code blocks have been validated. The earliest code block that is not validated (e.g., the code block before a code block that results in a validation signature that matches a corresponding stored signature) is identified as including at least one modification. The validation client 202 may generate the blockwise alerts 214 as an alert for each of the multiple code blocks of the validation code 270, thereby indicating whether each code block of the validation code 270 passed or failed validation.

After determining whether to issue alerts and generating the blockwise alerts 214, the validation client 202 may output a validation report 276 to the executing device. The validation report 276 may indicate an alert status and/or more specific information resulting from the validation process performed on the validation code 270. In some implementations, the validation report 276 may include the generated validation signatures (e.g., a plurality of validation signatures) that correspond to the code blocks of the validation code 270, the blockwise alerts 214 (e.g., blockwise validation indicators corresponding to the code blocks of the validation code 270), an overall alert status (e.g., a validation indication that represents whether the validation code 270 was validated or not, such as a flag), the stored signatures 274, or a combination thereof. For example, if the validation code 270 includes five code blocks, and the fourth and fifth code blocks fail validation, the validation report 276 may include the blockwise alerts 214 and the validation signatures 212. As another example, the validation report 276 may include only a flag indicating that validation failed. In some implementations, some of the information included in the validation report 276 may be based on user credentials or other information of an intended recipient. For example, all users may be permitted to receive the blockwise alerts 214, but only a subset of users with particular credentials may be permitted to receive the validation signatures 212 or the stored signatures 274. After receiving the validation report 276, the executing device 230 may perform one or more operations based on the validation report 276. For example, if the validation report 276 indicates that the validation code 270 has passed validation, the executing device 230 may execute the validation code 270. Alternatively, if the validation report 276 indicates that the validation code 270 failed validation, the executing device 230 may quarantine the validation code 270 to prevent execution, and the executing device 230 may flag the code blocks associated with alerts in the blockwise alerts 214 for manual inspection or other operations.

In some implementations, one or more operations may be performed based on the validation result and/or the validation report 276. For example, a message (e.g., an e-mail message, a short message system (SMS) message, a text message, etc.) may be generated and sent to one or more devices, including the executing device 230, if the validation code 270 fails validation (e.g., if an alert is issued). As another example, one or more actions may be performed based on execution of one or more business rules based on the validation result. To illustrate, business rules representing conditional operations based on satisfaction of conditions, such as if/then rules, do/while rules, etc., may be executed using the validation result as an input (e.g., a conditional input), and execution of the one or more business rules may initiate performance of one or more operations, such as turning on a light or other visual indicator, quarantining the computer code, disconnecting a network connection to the executing device 230 to quarantine the executing device 230, or the like. As another example, one or more robotic process automation (RPA) operations may be performed based on the validation result. To illustrate, one or more automated robotic components of an assembly line or other manufacturing bay, one or more autonomous or semi-autonomous vehicles, one or more automated robotic service providers, or the like, may be deactivated or otherwise sent into a standby state or instructed to perform a different set of commands based on an alarm being issued. As another example, one or more intelligent process automation (IPA) operations may be performed based on the validation result. To illustrate, one or more artificial intelligence (AI) or machine learning (ML) models, such as a neural network, may be trained based on the validation result to provide commands to an automated or semi-automated system.

As described above, the system 200 supports validation of computer code that is secured using dynamically generated digital signatures (e.g., hashed signatures). For example, the validation client 202 may generate the validation signatures 212 based on the validation code 270, and the validation client 202 may compare one or more of the validation signatures 212 to the stored signatures 274 retrieved from the signature database 240 to validate the validation code 270 (e.g., to determine if the validation code 270 has been modified after the generation of the stored signatures 274). The validation may be performed quickly by generating a few hash values and validation signatures, as compared to more complex code analysis or manual analysis techniques. Validating computer code prior to execution may reduce or prevent execution of computer code that has been tampered with by hackers or other malicious entities, thereby reducing or eliminating exposure to computer viruses, ransomware, man-in-the-middle attacks, and the like, in real-time or near real-time.

Figure 3:
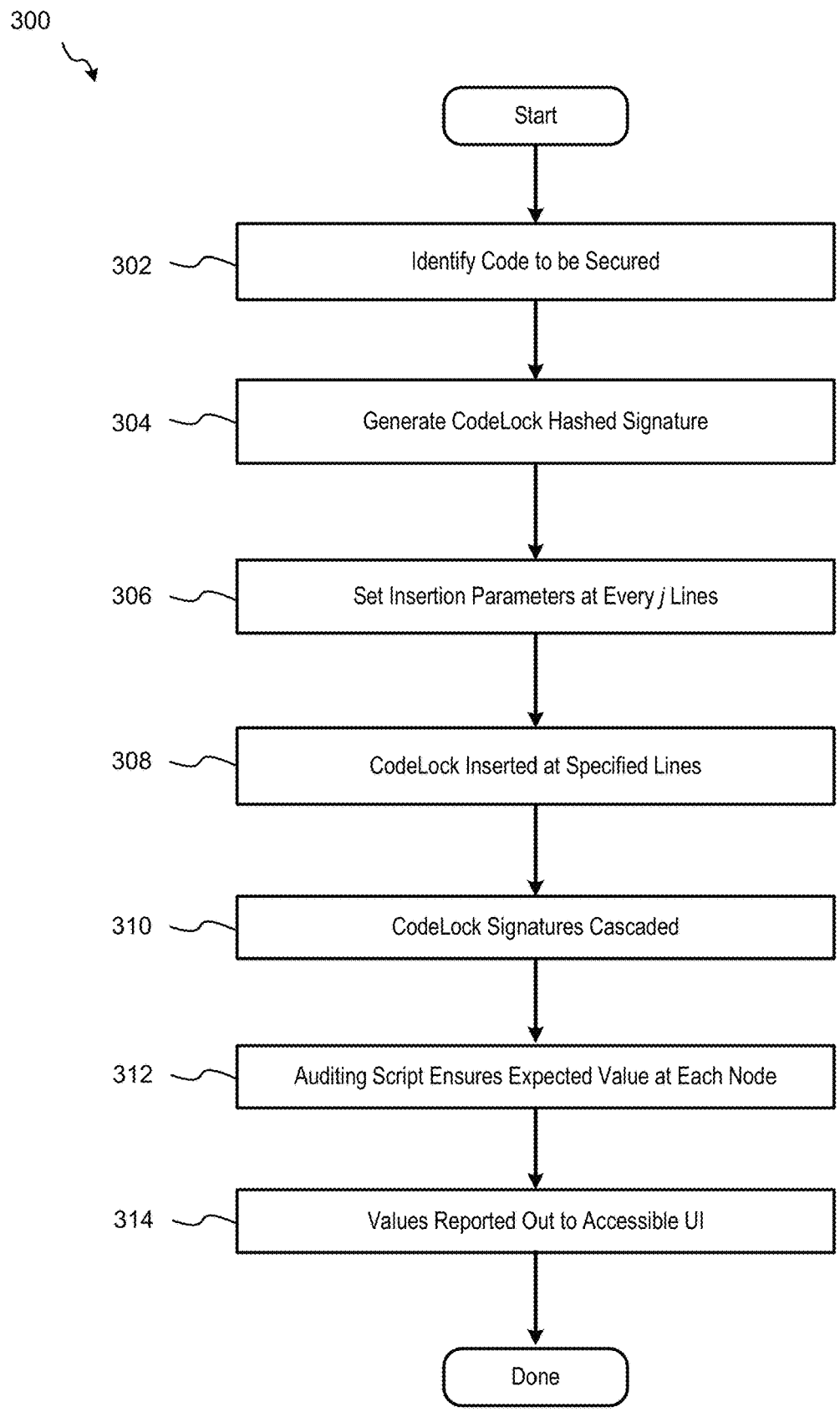
FIG. 3 is a flow diagram illustrating an example of a method for dynamic insertion of digital signatures into code according to one or more aspects.

Referring to FIG. 3, an example of a method for dynamic insertion of digital signatures into code according to one or more aspects is shown as a method 300. In some implementations, the method 300 may be performed by the system 100 (e.g., the code security client 102) of FIG. 1.

The method 300 includes identifying code to be secured, at 302. For example, the code may be generated as part of a software development process or received or accessed from another location, such as a code repository. To illustrate, the code may include or correspond to the code 170 of FIG. 1 that is generated by the IDE 130 and that is stored at the code repository 142. The method 300 includes generating a hashed signature (e.g., a "CodeLock Hashed Signature," which is a particular type of digital signature as described herein) associated with the identified software, at 304. Generating the hashed signature may include setting insertion parameters at every j lines, at 306. For example, the insertion parameters may correspond to a fixed size (e.g., j is any integer greater than one), or the insertion parameters may be dynamically determined (e.g., j may be selected based on one or more parameters of the identified code, such as a size of the code, a type of the code, etc.). Generating the hashed signature may also include inserting digital signature function calls (e.g., "CodeLock" function calls) at specified lines, at 308. For example, the digital signature function calls, also referred to as hashed signature function calls, may be inserted after every j lines of code.

Generating the hashed signature may also include cascading the digital signatures (e.g., the "CodeLock Signatures") generated by the digital signature function calls, at 310. For example, the digital signatures may be structured as a sequentially dependent hash tree. Generating the hashed signature may further include executing an auditing script to ensure (e.g., verify) expected values at each node, at 312. For example, each node that receives the identified code (after insertion of the digital signature function calls) may execute an auditing script that compares digital signatures generated by the respective node to a digital signature data structure (e.g., a linked hash chain or blockchain-type structure of signatures) that is associated with the identified code. The digital signature data structure may be generated and distributed by a device that creates the identified code or that is configured to secure code prior to distribution, such as a security client located between the IDE and a code repository, as a non-limiting example.

The method 300 includes reporting values to an accessible user interface (UI), at 314. For example, a UI may be configured to display the digital signatures, binary yes/no reports on the integrity of digital signature matches, other information, or a combination thereof, to one or more users. In this method, the UI may provide a user with an indication of if received code has been validated or if an alert has been generated to indicate that the received code has been modified after the original code was secured (e.g., the digital signatures were generated). Additionally, or alternatively, if an alert is detected, the received code may be quarantined or otherwise prevented from being executed to protect devices from being exposed to potentially maliciously modified code.

Referring to FIG. 4, an example of modified code that includes insertion of digital signatures according to one or more aspects is shown as code 400. In some implementations, the code 400 may include or correspond to software, such as an application, a program, a sub-program, or the like.

The code 400 may include lines of code that are configured to perform one or more operations. Additionally, the code 400 may include one or more digital signature function calls. As described above, the digital signature function calls may be inserted at one or more predefined locations within code to be signed and secured using digital signatures. In the example shown in FIG. 4, the code 400 includes four digital signature function calls (labeled "CodeLock Function" in FIG. 4): a first digital signature function call is inserted at line 1, a second digital signature function call is inserted at line 13, a third digital signature function call is inserted at line 25, and a fourth digital signature function call is inserted at line 51. Each digital signature function call may be configured to generate a digital signature based at least in part on a code block to which the digital signature function call is appended. As one example, the second digital signature function call may be configured to generate a digital signature based at least in part on the code included in lines 2-12 (e.g., a first code block). Additionally, as described above, each digital signature function call may be configured to generate a digital signature that is based at least in part on the respective digital signature function call and a previous digital signature. As one example, the second digital signature function call may be configured to generate a digital signature based on the coded included in lines 2-12 (e.g., the first code block), the second digital signature function call included in line 13, and a first digital signature generated by the first digital signature function call included in line 1. In some implementations, the digital signature may be further based on a third digital signature generated by the third digital signature function call included in line 25 or a digital signature generated based on an entirety of the code 400. For example, after generating digital signatures for each code block, based on the function calls shown in FIG. 4, an additional digital signature may be generated as a hash value based on an entirety of the code 400 including the inserted digital signature function calls (e.g., lines 1-52).

In some implementations, upon generation, the digital signatures may be inserted into the code 400 for forming notional code containers from the code blocks. The digital signatures may be inserted in the same comment as a corresponding digital signature function call, or in a separate comment on the line prior to or following the digital signature function call. For example, a first digital signature may be inserted in (or after) line 1, a second digital signature may be inserted in line 13, a third digital signature may be inserted in line 25, and a fourth digital signature may be inserted in line 51. In this manner, the insertion of digital signature function calls in the code 400 (and the digital signatures themselves) may enable the code 400 to be "containerized" and signed, providing security and enabling verification that the code 400 is not tampered with by external entities. In some other implementations, as described further herein with reference to FIGS. 5-8, the digital signatures for each code block may be stored externally to the code 400, which supports restricting access to the digital signatures based on authorization levels, which may improve security and prevent or reduce the likelihood of the digital signatures being reverse engineered (e.g., "cracked").

Figure 5:
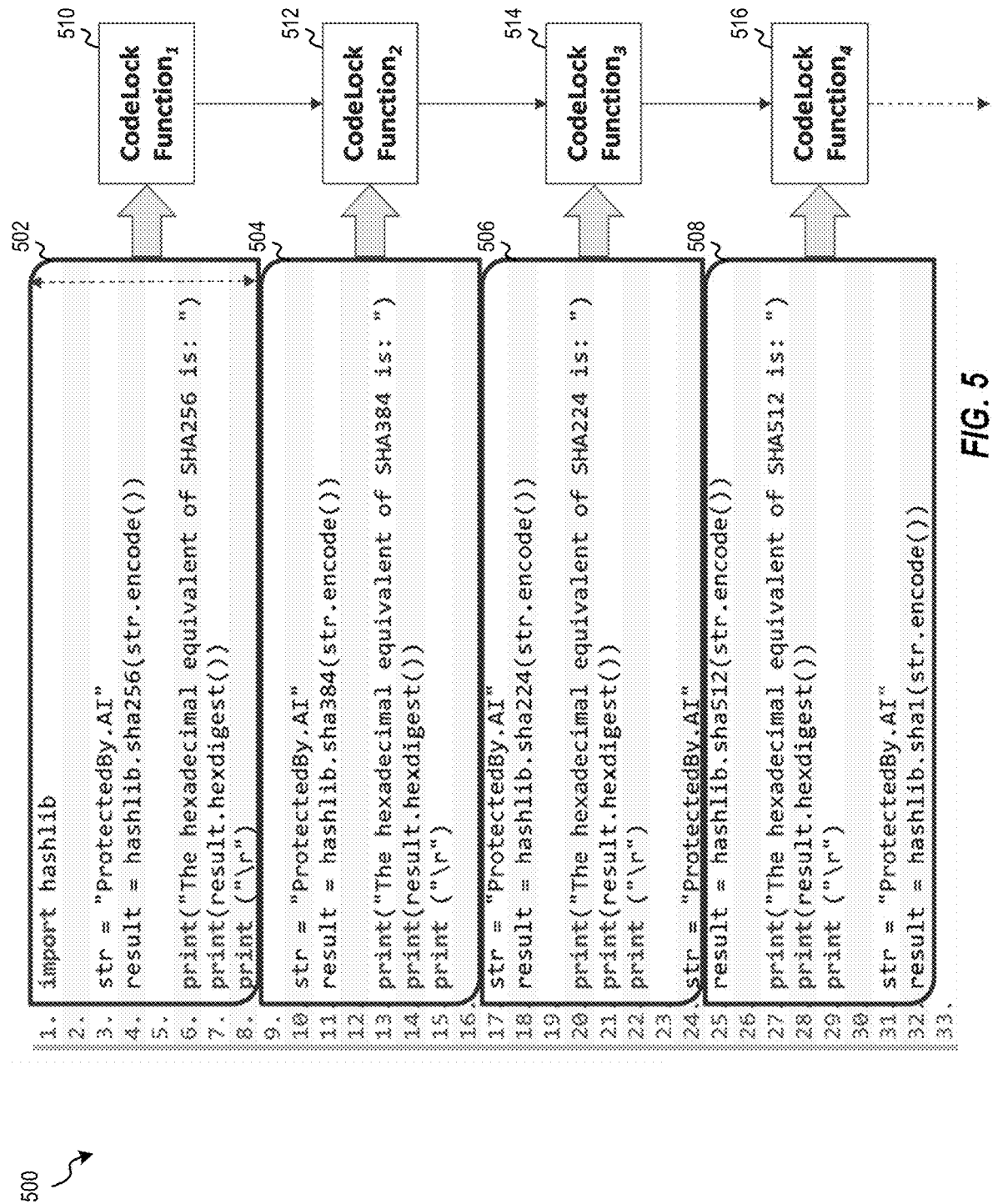
FIG. 5 illustrates an example of dividing code into code blocks for generating digital signatures according to one or more aspects.

Referring to FIG. 5, an example of dividing code into code blocks for generating digital signatures according to one or more aspects is shown with reference to code 500. In some implementations, the code 500 may include or correspond to the code 170 of FIG. 1. As shown in FIG. 5, the code 500 includes thirty-two lines of code, and the code 500 is divided (e.g., segmented) into four code blocks: a first code block 502, a second code block 504, a third code block 506, and a fourth code block 508. In this example, each code block includes eight lines of code. Although an example in which each code block has the same size is shown, in other implementations, one or more code blocks may have different sizes than other code blocks. The size of the code blocks may be predetermined or may be based on one or more properties of the code 500, such as the size of the code 500 (e.g., a total number of lines), authors of the code 500 (e.g., each code block may correspond to a different author in situations where multiple authors create the code 500), a target code block granularity, or the like. The size of the code blocks, or methods for dynamically determining the size of the code blocks, may be preprogrammed at a code security client, may be selected based on user input, may be determined based on properties of the code 500, an IDE that generates the code 500, a repository at which the code 500 is to be stored, other properties, or the like. As shown in FIG. 5, the code blocks are non-overlapping and have a sequential order, such that the first code block 502 is a sequentially first code block of the code 500, the second code block 504 subsequently follows the first code block 502, the third code block 506 subsequently follows the second code block 504, and the fourth code block 508 subsequently follows the third code block 506. In other implementations, the code blocks 502-508 may include one or more overlapping code blocks or may have a different order.

As described with reference to FIG. 1, each of the code blocks 502-508 may be used to generate a respective hashed signature (e.g., a digital signature) by applying a particular hash function (e.g., a CodeLock function) to a representational value of a code block, optional additional information associated with the code block (e.g., timestamp, security data, user information or credentials, or the like) and another hashed signature (e.g., corresponding to a prior code block in the sequential order). To illustrate, a first hashed signature function 510 ("CodeLock Function$_1$") may be applied to a representational value corresponding to the first code block 502, additional information associated with the first code block 502 (in some implementations), and an initial or default hashed signature (not shown for convenience in FIG. 5, such a signature is further described with reference to FIG. 6) to generate a first hashed signature. As described with reference to FIG. 1, the representational value of the first code block 502 may be a hash value based on the first code block 502 (or a portion thereof), and the first hashed signature may be stored, such as at a signature database. The first hashed signature and a representational value (e.g., hash value) of the second code block 504 (and optionally additional information) may be provided as inputs to a second hashed signature function 512 ("CodeLock Function$_2$") to generate a second hashed signature, the second hashed signature and a representational value (e.g., hash value) of the third code block 506 (and optionally additional information) may be provided as inputs to a third hashed signature function 514 ("CodeLock Function$_3$") to generate a third hashed signature, and the third hashed signature and a representational value (e.g., hash value) of the fourth code block 508 (and optionally additional information) may be provided as inputs to a fourth hashed signature function 516 ("CodeLock Function$_4$") to generate a fourth hashed signature. Although shown as individual hashed signature functions, the hashed signature functions 510-516 may perform the same function on the respective inputs. If the code 500 includes additional lines, additional code blocks of eight lines may be similarly processed to generate additional hashed signatures, each based at least partially on a hashed signature corresponding to a prior code block.

Because each hashed signature is based at least partially on a hashed signature corresponding to a prior code block, the hashed signature functions 510-516 generate hashed signatures that are linked to form a hashed list (e.g., a blockchain-type structure) that enables each hashed signature to be used to determine whether the corresponding code block and any prior code blocks in the sequential order have been modified after generation of the hashed signatures. For example, if a later validation signature based on the second code block 504 does not match the second hashed signature, either the second code block 504, the first code block 502, or both, have been modified. As another example, if a later validation signature based on the fourth code block 508 does not match the fourth hashed signature, at least one of the code blocks 502-506 has been modified. Although not shown in FIG. 5, function calls to the hashed signature functions 510-516 may be inserted into the code 500. The function calls may be inserted as comments into existing lines of the code blocks, or into a newly added line, at particular locations within the code blocks. As a non-limiting example, a function call to the first hashed signature function 510 may be inserted in a new line between lines 8 and 9, a function call to the second hashed signature function 512 may be inserted in a new line between lines 16 and 17, a function call to the third hashed signature function 514 may be inserted in a new line between lines 24 and 25, and a function call to the fourth hashed signature function 516 may be added in a new line after line 32. The hashed signature functions 510-516 may be applied by a system described with reference to FIG. 6 to generate the hashed chain (e.g., a plurality of hashed signatures that are linked in a blockchain-type structure).

Figure 6:
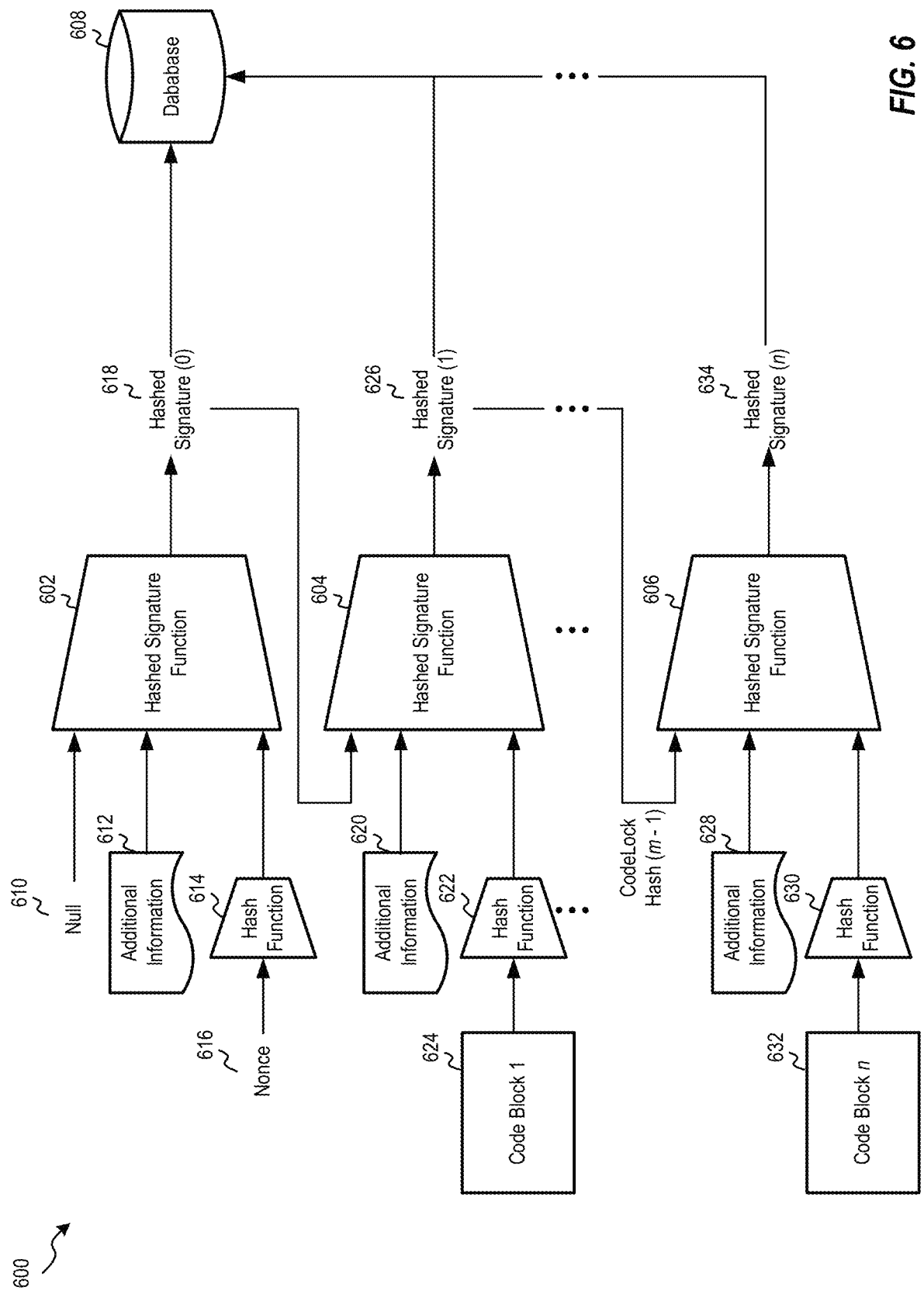
FIG. 6 is a block diagram of an example of digital signature generation system for securing computer code according to one or more aspects.

Referring to FIG. 6, an example of a digital signature generation system for securing computer code according to one or more aspects is shown as a system 600. In some implementations, components of the system 600 may be included in or correspond to the system 100 of FIG. 1 (or components thereof). As shown in FIG. 6, the system 600 includes a first hashed signature function 602, a second hashed signature function 604, an nth hashed signature function 606, a first hash function 614, a second hash function 622, an nth hash function 630, and a database 608. The hash functions 614, 622, and 630 are configured to generate representational values (e.g., hash values) of code blocks, similar to the code hash function 122 of FIG. 1. The hashed signature functions 602-606 (e.g., CodeLock functions) are configured to generate hashed signatures based on representational values (e.g., hash values) of code blocks, optional additional information, and hashed signatures corresponding to prior code blocks, similar to the hashed signature generator 124. To further illustrate, the hashed signature functions 602-606 may include or correspond to the hashed signature functions 510-516 of FIG. 5. The database 608 may include or correspond to a database or other storage location, such as a server, storage device, or cloud storage service, that is configured to store hashed signatures for use in securing and validating computer code. In some implementations, the database 608 may include or correspond to the signature database 140 of FIG. 1.

During operation of the system 600, computer code may be divided (e.g., segmented) into multiple code blocks including a first code block 624 ("Code Block 1") and an nth code block 632 ("Code Block n"), where n is any integer greater than one. As explained above, the size and number of the code blocks may be predetermined or determined dynamically based on properties of the computer code. In some implementations, the computer code, the first code block 624, and the nth code block 632 may include or correspond to the code 500, the first code block 502, and the fourth code block 508 of FIG. 5, respectively. In order to generate an initial/default hashed signature, a nonce 616 (or other null value) may be provided as input to the first hash function 614 to generate an initial hash value, and the initial hash value, a null value 610 (representing that this is the initial hashed signature), and first additional information 612 (e.g., one or more nonces or null values, or other default/initial information) may be provided as inputs to the first hashed signature function 602. The first hashed signature function 602 may perform a hash function (e.g., a CodeLock function) on the inputs to generate an initial hash signature 618 ("Hashed Signature (0)"), also referred to as a hashed signature of a 0th code block. The initial hash signature 618 may be stored at the database 608 and provided to a next state of the hashed signature generation system (e.g., state 1, corresponding to the first code block 624).

The first code block 624 may be provided to the second hash function 622 to generate a first representational value (e.g., a first hash value) corresponding to the first code block 624, and the first representational value, first additional information 620 associated with the first code block 624, and the initial hash signature 618 may be provided as inputs to the second hashed signature function 604. The second hashed signature function 604 may perform the hash function (e.g., the CodeLock function) on the inputs to generate a first hashed signature 626 ("Hashed Signature (1)"). The first hashed signature 626 may be stored at the database 608 and provided to a next state of the hashed signature generation system (e.g., state 2, corresponding to a second code block (not shown)). The nth code block 632 may be provided to the nth hash function 630 to generate an nth representational value (e.g., an nth hash value) corresponding to the nth code block 632, and the nth representational value, nth additional information 628 associated with the nth code block 632, and an (n−1)th hashed signature may be provided as inputs to the nth hashed signature function 606. The nth hashed signature function 606 may perform the hash function (e.g., the CodeLock function) on the inputs to generate an nth hashed signature 634 ("Hashed Signature (n)"). The nth hashed signature 634 may be stored at the database 608. By generating the hashed signatures 626, 634 in this manner, the system 600 supports securing of computer code by dynamically generating hashed signatures that are linked to form a hash chain (e.g., a blockchain-type structure) that can be used to validate code as being tamper free. Additional details of the operations of the system 600 are described below with reference to FIG. 7.

Figure 7:
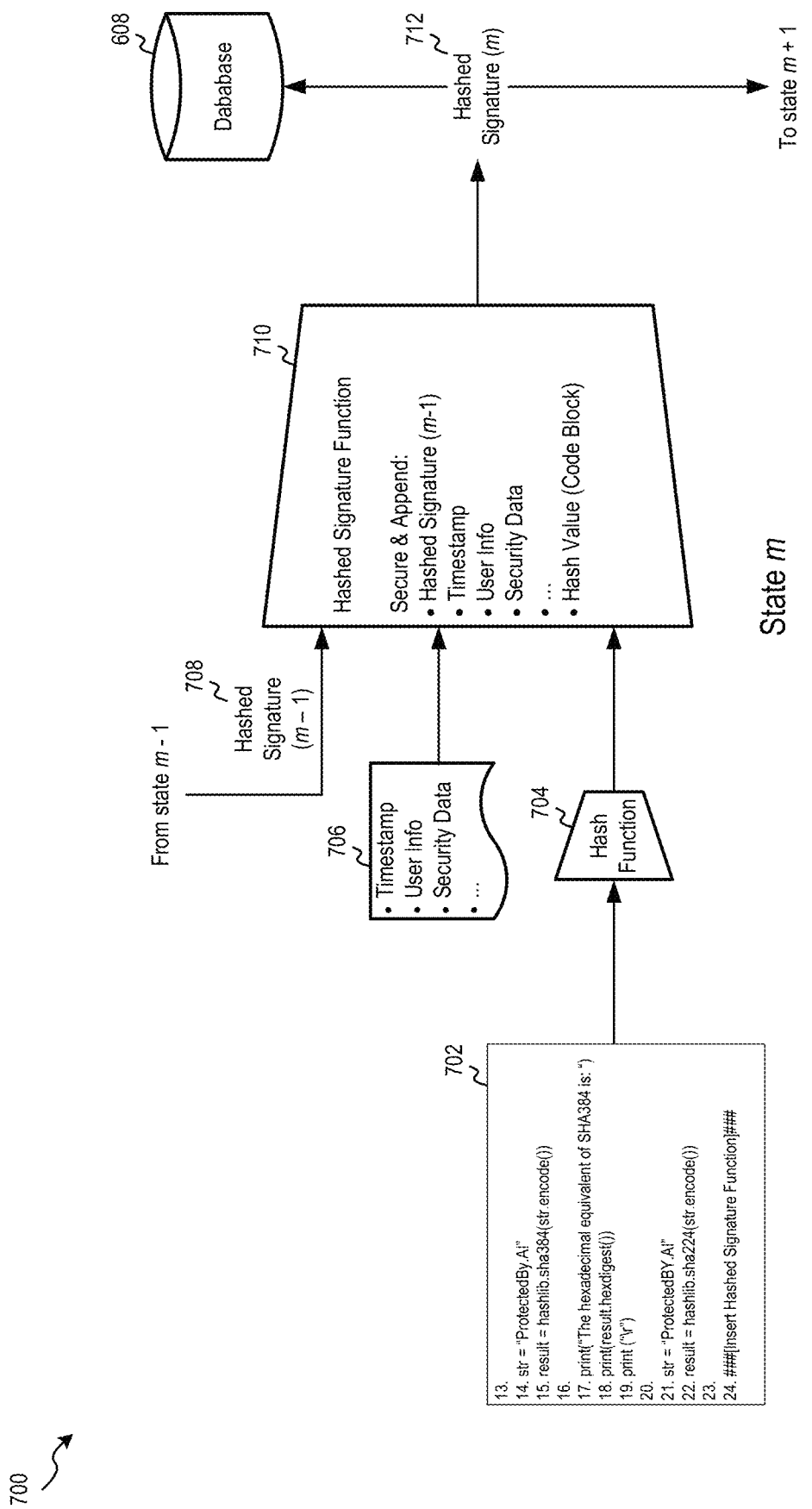
FIG. 7 is a block diagram of a portion of the system of FIG. 6 corresponding to a particular state according to one or more aspects.

Referring to FIG. 7, an example of a portion of the system 600 of FIG. 6 corresponding to a particular state according to one or more aspects is shown as a system 700. For example, the system 700 may include at least one or more components of the system 600 that correspond to state m (e.g., to generating a digital signature for an mth block of code), where m is any integer greater than one. State m−1 is prior to state m and state m+1 is subsequent to state m (e.g., the code blocks are ordered m−1→m>m+1 in the computer code to be secured). As shown in FIG. 7, the system 700 includes a hash function 704 (e.g., an mth hash function), a hashed signature function 710 (e.g., an mth hashed signature function), and the database 608.

During operation of the system 700, an mth code block 702 (corresponding to lines 13-24 in the example of FIG. 7) is provided as an input to the hash function 704 to generate an mth representational value (e.g., an mth hash value) based on the mth code block 702. As explained above with reference to FIG. 1, the hash function 704 may include any type of secure hash function, such as SHA-256 or SHA-512, as non-limiting examples. Although described as generating the representational value based on the mth code block 702 (e.g., an entirety of the code block), in some other implementations, only a portion (e.g., less than an entirety) of the mth code block 702.

The mth representational value generated by the hash function 704, additional information 706, and a prior hashed signature 708 ("Hashed signature (m−1)") may be provided as inputs to the hashed signature function 710 for appending, or otherwise combining, and generation of a hash value as a hashed signature that corresponds to the mth code block 702. The prior hashed signature 708 is output by a hashed signature function of a prior state (e.g., an (m−1)th state), as illustrated in FIG. 6. For example, the nth hashed signature function 606 of FIG. 6 receives a hashed signature output by an (n−1)th hashed signature function as an input in order to link the output of the nth signature function (e.g., the nth hashed signature 634) to the (n−1)th hashed signature as part of a hashed chain. The additional information 706 includes information related to the computer code to be secured. As an example, the additional information 706 may include a timestamp (or date information) that indicates a time and/or date of generation of the computer code. As another example, the additional information 706 may include user information associated with an author (or modifier) of the computer code, such as a user name or identifier (ID), a device ID of a device from which the user logged in to generate the computer code, such as an IP address, contact information for the user, an account associated with the user, a digital signature associated with the user, privileges associated with the user, other user information, or the like. As another example, the additional information 706 may include security data, such as user or device authentication information, privileges, or the like. As other examples, the additional information 706 may include any relevant provenance information generated through referenced records or obtained in the course of developing a hashed signature, such as browser and configuration information, user-agent strings, clock information, web browser plugins, TCP stat variation, installed fonts, JavaScript objects, internal APIs, device information (e.g., screen resolution, touch support, OS, language, etc.), flash data, a list of mime-types, CSS information, HTTP headers, geographical provenance, IP addresses, MAC addresses, other information, or a combination thereof. In some implementations, the additional information 706 is associated with the computer code as an entirety (e.g., each code block has the same additional information). Alternatively, the additional information 706 may be obtained on a blockwise level, such that each code block is associated with its own respective additional information (e.g., timestamps, authors, security data, etc.), which supports shared generation and creation of computer code by multiple users across multiple devices of an IDE. The additional information 706 is optional, and as such, any or none of the described additional information 706 may be used by the hashed signature function 710.

The hashed signature function 710 may secure and append the prior hashed signature 708, the additional information 706, and the representational value (e.g., the hash value) generated by the hash function 704 to create a package (e.g., a data package). For example, the additional information 706 may be appended to the prior hashed signature 708, and the representational value may be appended to the additional information 706 to generate the package. Such ordering is illustrative, and any order of appending or type of combining of the prior hashed signature 708, the additional information 706, and the representational value is contemplated by aspects of this disclosure. The hashed signature function 710 (e.g., a CodeLock function) applies a hash function to the package to generate a hashed signature 712 (e.g., an mth hashed signature) for the mth state. As described above, the hashed signature function 710 may include or correspond to any type of secure hash function, such as SHA-256 or SHA-512, as non-limiting examples. After the hashed signature 712 is generated, the hashed signature 712 is stored at the database 608, if there is an (m+1)th code block, the hashed signature 712 is provided as an input to a hashed signature function of the (m+1)th state.

The hashed signature function 710 provides improvements as compared to other code securing techniques by generating a hashed signature that is linked to one or more previous hashed signatures, such that multiple hashed signatures generated for multiple code blocks are linked to form a hashed chain. For example, the hashed signature 712 for the mth code block is linked to the (m−1)th code block by appending or otherwise combining the prior hashed signature 708 with the inputs used to generate the hashed signature 712. Because hashed signatures for each state are generated in a similar manner, each hash signature is directly linked to an immediately prior hashed signature, and indirectly linked to each other prior hashed signature through linking from one hashed signature to another back to a hashed signature for a first code block. Thus, the hashed signatures form a blockchain-type structure that provide similar benefits, such as enabling detection of modification and effectively rendering the computer code immutable after being secured.

Figure 8:
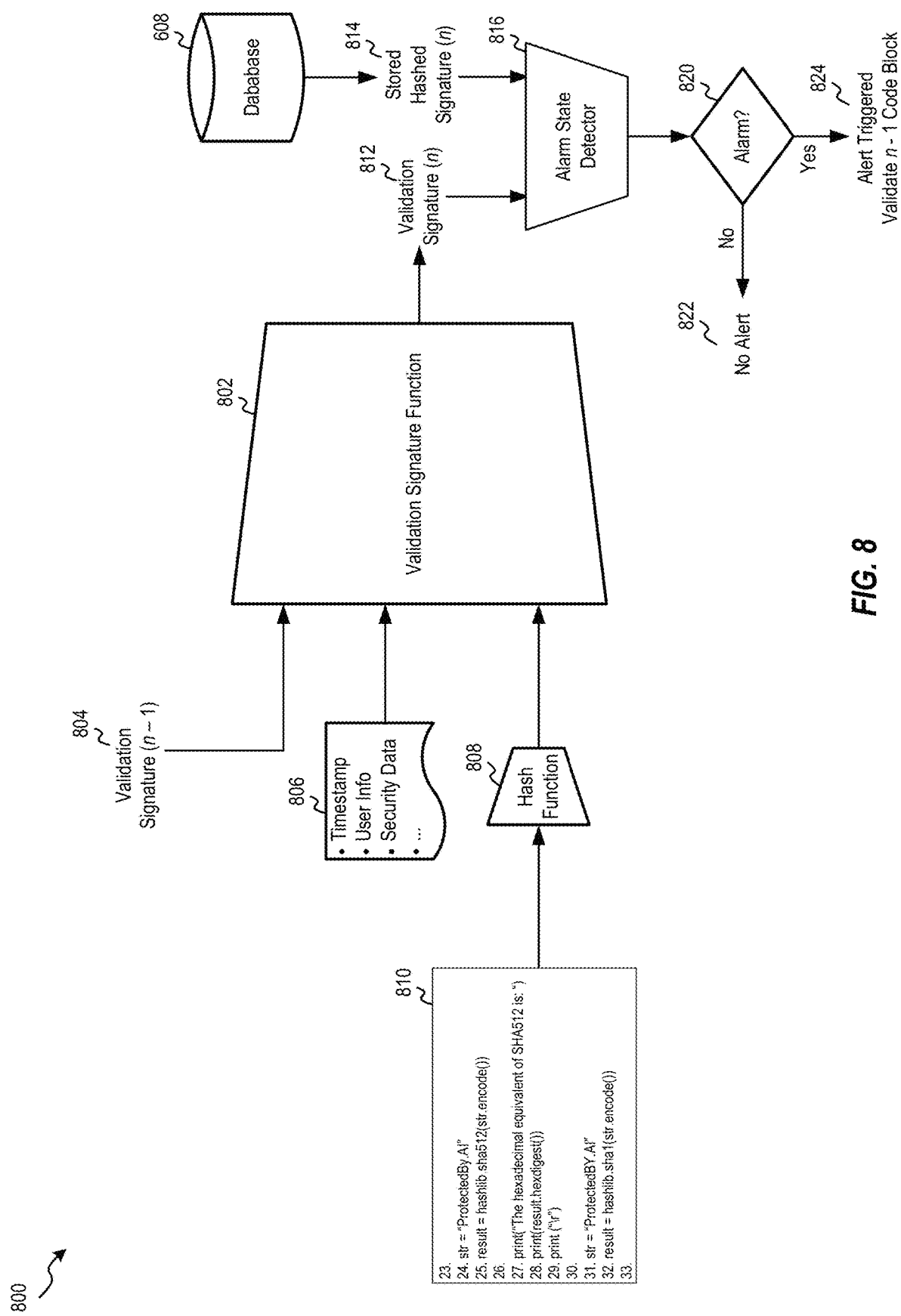
FIG. 8 is a block diagram of a portion of a system for validating code secured by the system of FIG. 6 according to one or more aspects.

Referring to FIG. 8, an example of a portion of a system for validating code secured by the system 600 of FIG. 6 according to one or more aspects is shown as a system 800. The system 800 may include components similar to those of FIGS. 6-7, except instead of being configured to generate digital signatures (e.g., hashed signatures) for storage, the system 800 is configured to leverage the stored digital signatures for comparing to dynamically generated validation signatures (e.g., hashed signatures) that are based on code to be validated. For example, the system 800 may be configured to perform one or more operations as described with reference to FIG. 2. In the particular example shown in FIG. 8, the system 800 corresponds to state n (e.g., a last state that validates a last code block of received code to be validated). In other implementations, similar components and operations to those described with reference to FIG. 8 may be applied to validate other blocks of received validation code, such as to iteratively validate prior code blocks as further described with reference to FIG. 2. As shown in FIG. 8, the system 800 includes a validation signature function 802 (e.g., an nth validation signature function), a hash function 808 (e.g., an nth hash function), an alarm state detector 816, and the database 608. The validation signature function 802 and the hash function 808 may be configured to perform operations as described with reference to the hashed signature function 710 and the hash function 704 of FIG. 7, respectively.

During operation of the system 800, an nth code block 810 may be provided as input to the hash function 808 to generate an nth representational value (e.g., an nth hash value) that corresponds to the nth code block 810. The nth representational value, a prior validation signature 804 ("Hashed Signature (n−1)"), and the nth representational value may be provided as inputs to the validation signature function 802. The validation signature function 802 may apply a hash function to the inputs to generate an nth validation signature 812 ("Validation Signature (n)"), similar to the hashed signature function 710 of FIG. 7. In some implementations, validation signatures for each code block may be generated, as described above with reference to FIGS. 6-7, and the prior validation signature 804 is received from a prior state (e.g., an (n−1)th state). In such implementations, validation signatures for each code block of the code to be validated are generated, since subsequent validation signatures are based at least partially on prior validation signatures, even though the validation process may successfully validate the code based on a single comparison (e.g., a comparison of the nth validation signature 812 and a last stored hashed signature).

After generating the nth validation signature 812, an nth stored hashed signature 814 ("Stored Hashed Signature (n)") may be retrieved from the database 608. The nth stored hashed signature 814 corresponds to the same code block of the originally secured code as the nth validation signature 812 (e.g., the nth stored hashed signature 814 is the last hashed signature in the hash chain and corresponds to the last code block of the originally secured code). The alarm state detector 816 may receive and compare the nth validation signature 812 and the nth stored hashed signature 814 to determine whether an alarm state is detected. In some implementations, the alarm state detector 816 is configured to perform an exclusive-OR (XOR) operation on the nth validation signature 812 and the nth stored hashed signature 814 to perform the comparison. Because each validation signature and stored hashed signature are based on prior signatures (e.g., due to the nature of the linked hash chain), if a validation signature matches a corresponding stored hashed signature, the corresponding code block and all prior code blocks are validated.

If an alarm is not detected (e.g., if the nth validation signature 812 and the nth stored hashed signature 814 match), at 820, the validation process continues to 822, and no alert is issued. Based on no alert being issued, a device may execute or share the code as the code has not been modified since generation of the stored hashed signatures. Alternatively, if an alarm is detected (e.g., if the nth validation signature 812 and the nth stored hashed signature 814 do not match) at 820, the validation process proceeds to 824, and an alert is triggered. Responsive to triggering an alert, iterative validation of the remaining code blocks may be performed, beginning with an (n−1)th code block, to identify if all or only a subset (e.g., less than all) of the code blocks have been tampered with (e.g., modified), such as by a hacker or other malicious entity. In some implementations, as further described with reference to FIG. 2, a validation report may be generated, and this report may indicate a validation status (e.g., validated or not) of the code, block-wise validation indicators, some or all of the validation signatures and/or the stored signatures, other information, or a combination thereof. Additionally, or alternatively, one or more operations may be performed based on the validation output and/or the validation report, such as sending alert messages, executing one or more business rules, one or more RPA operations, one or more IPA operations, or a combination thereof.

Figure 9:
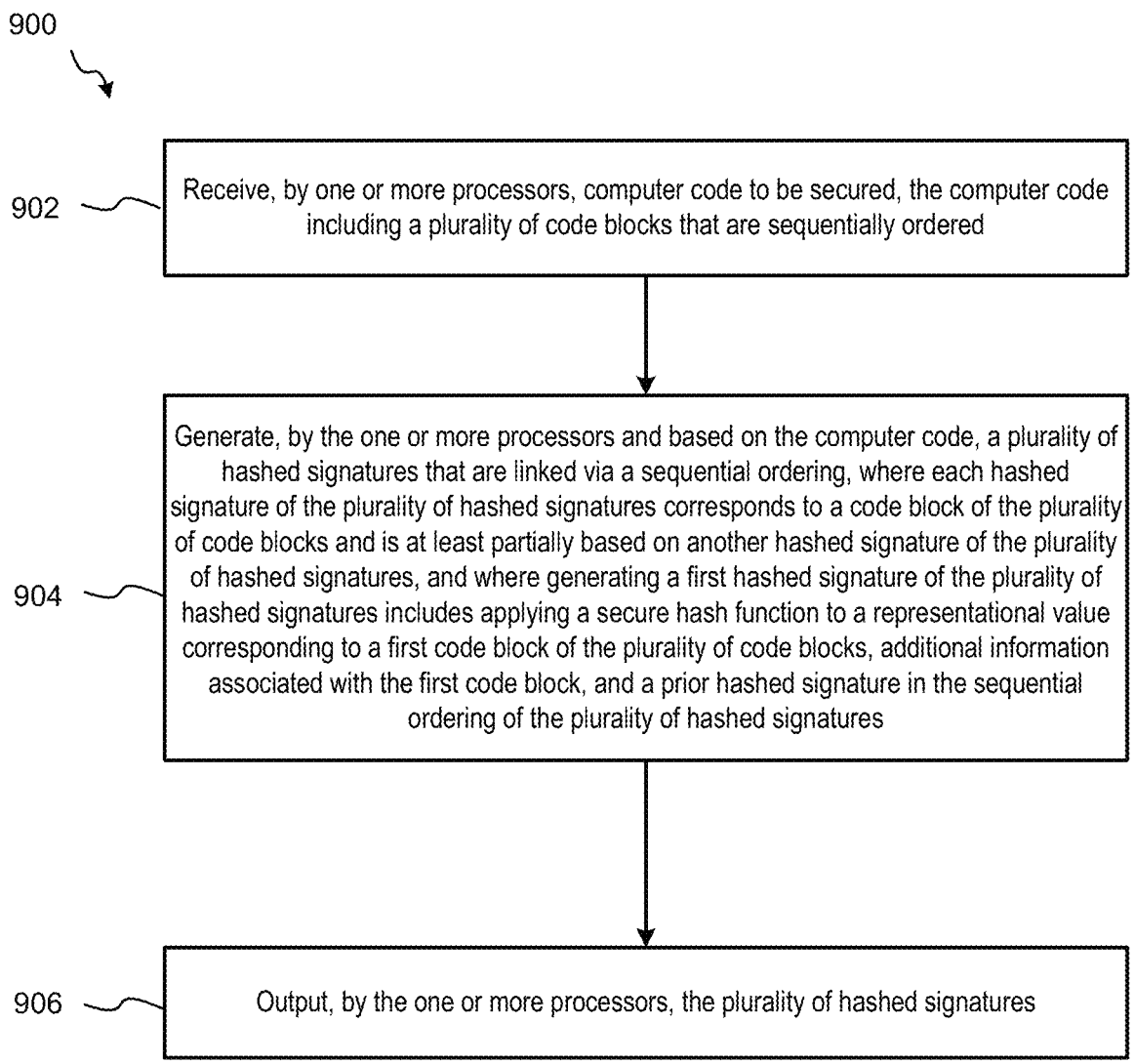
FIG. 9 is a flow diagram illustrating an example of a method that secures computer code from tampering according to one or more aspects.

Referring to FIG. 9, a flow diagram of an example of a method for securing computer code from tampering according to one or more aspects is shown as a method 900. In some implementations, the operations of the method 900 may be stored as instructions that, when executed by one or more processors (e.g., the one or more processors of a computing device or a server), cause the one or more processors to perform the operations of the method 900. In some implementations, the method 900 may be performed by a computing device, such as the code security client 102 of FIG. 1 (e.g., a computing device configured for securing computer code), the validation client 202 of FIG. 2, one or more components of the system 600 of FIG. 6, one or more components of FIG. 7, one or more components of FIG. 8, or a combination thereof.

The method 900 includes receiving computer code to be secured, at 902. The computer code includes a plurality of code blocks that are sequentially ordered. For example, the computer code may include or correspond to the code 170 of FIG. 1.

The method 900 includes generating, based on the computer code, a plurality of hashed signatures that are linked via a sequential ordering, at 904. Each hashed signature of the plurality of hashed signatures corresponds to a code block of the plurality of code blocks and is at least partially based on another hashed signature of the plurality of hashed signatures. Generating a first hashed signature of the plurality of hashed signatures includes applying a secure hash function to a representational value corresponding to a first code block of the plurality of code blocks, additional information associated with the first code block, and a prior hashed signature in the sequential ordering of the plurality of hashed signatures. For example, the secure hash function may include or correspond to a hash function/signature generation operation performed by the hashed signature generator 124 of FIG. 1, the additional information may include or correspond to the additional information 172 of FIG. 1, and the plurality of hashed signatures may include or correspond to the hashed signatures 112 of FIG. 1. The method 900 further includes outputting the plurality of hashed signatures, at 906.

In some implementations, outputting the plurality of hashed signatures includes storing the plurality of hashed signatures at a database. For example, the database may include or correspond to the signature database 140 of FIG. 1. Additionally, or alternatively, outputting the plurality of hashed signatures may include inserting the plurality of hashed signatures into the plurality of code blocks to generate secured code and storing the secured code in a code repository. For example, the secured code may include or correspond to the secured code 174 of FIG. 1, and the code repository may include or correspond to the code repository 142 of FIG. 1.

In some implementations, the additional information associated with the first code block includes a timestamp associated with the first code block, user information associated with a user that authored the first code block, credentials associated with the user, security data associated with the first code block or the user, or a combination thereof. For example, the additional information may include timestamps, user information, credentials, security data, or the like, as further described with reference to FIG.

7. Additionally, or alternatively, the representational value corresponding to the first code block may include a first hash value based on the first code block. For example, the representational value may include or correspond to a hash value generated by the code hash function 122 of FIG. 1.

In some implementations, generating a second hashed signature of the plurality of hashed signatures includes applying the secure hash function to a representational value corresponding to a second code block of the plurality of code blocks, additional information associated with the second code block, and the first hashed signature. For example, multiple hashed values may be generated based on multiple code blocks, as further described with reference to FIGS. 6-7. Additionally, or alternatively, the method 900 may also include inserting a function call to the secure hash function as a particular line of code in each code block of the plurality of code blocks. For example, digital signature function calls may be inserted at particular line(s) of code, as described with reference to FIG. 4. Additionally, or alternatively, the method 900 may also include, after generating the hashed signature for each code block of the plurality of code blocks, generating a hashed signature based on a representational value corresponding to an entirety of the computer code, additional information associated with the entirety of the computer code, and the plurality of hashed signatures. For example, a hashed signature may be generated based on an entirety of code (and any inserted digital signature function calls), as further described with reference to FIG. 4.

In some implementations, the method 900 also includes receiving second computer code to be validated. The second computer code includes a second plurality of code blocks that are sequentially ordered. In such implementations, the method 900 further includes generating a first validation signature based on a representational value corresponding to a last code block of the second plurality of code blocks, additional information associated with the last code block, and a second-to-last hashed signature in the sequential ordering of the plurality of hashed signatures, and determining whether to issue an alert based on a comparison of the first validation signature and a last hashed signature in the sequential ordering of the plurality of hashed signatures. For example, the second computer code may include or correspond to the validation code 270 of FIG. 2, the additional information may include or correspond to the additional information 272 of FIG. 2, the second-to-last hashed signature may include or correspond to one of the stored signatures 274 of FIG. 2, and the alert may include or correspond to the blockwise alerts 214 of FIG. 2. In some such implementations, the method 900 may further include determining not to issue the alert based on the first validation signature matching the last hashed signature and outputting validation of the second computer code. For example, the validation may include or correspond to the validation report 276 of FIG. 2. In some other such implementations, the method 900 may further include determining to issue the alert based on the first validation signature failing to match the last hashed signature and iteratively performing validation on each code block of the second plurality of code blocks until a determination of a valid code block of the second plurality of code blocks. For example, iteratively performing the validation may include or correspond to generating one or more of the blockwise alerts 214 of FIG. 2. Additionally, or alternatively, the method 900 may also include outputting a validation report based on the second computer code. The validation report includes a plurality of validation signatures, block-wise validation indicators corresponding to the second plurality of code blocks, or a validation indication corresponding to an entirety of the second computer code. For example, the validation report may include or correspond to the validation report 276 of FIG. 2.

As described above, the method 900 supports securing computer code using dynamically generated digital signatures (e.g., hashed signatures). For example, the method 900 includes generating hashed signatures based on code blocks of received code (e.g., prior to storage in a code repository), and the hashed signatures may be stored at a database or inserted into the code itself to enable validation at a later time that the code has not been modified. The hashed signatures generated by the method 900 may be linked to form a hash chain by generating each of the hashed signatures based on at least one other hashed signature (e.g., a hashed signature corresponding to a prior code block in a sequence of code blocks that make up the code). Generating such linked digital signatures causes the combination of secured code and the hashed signatures to become mutually reinforcing and to create a tamper-proof blockchain-type structure that enables identification of any unauthorized additions, deletions, or changes to the secured code. The secured code may be validated, based on dynamic generation of additional hashed signatures (e.g., validation signatures), to prevent execution of tampered code, which may reduce or prevent exposure to computer viruses, ransomware, malware, or the like.

It is noted that other types of devices and functionality may be provided according to aspects of the present disclosure and discussion of specific devices and functionality herein have been provided for purposes of illustration, rather than by way of limitation. It is noted that the operations of the method 300 of FIG. 3 and the method 900 of FIG. 9 may be performed in any order, or that operations of one method may be performed during performance of another method. For example, one or more operations of the method 300 of FIG. 3 may be performed during operation of the method 900 of FIG. 9, or vice versa. It is also noted that the method 300 of FIG. 3 or the method 900 of FIG. 9 may also include other functionality or operations consistent with the description of the operations of the system 100 of FIG. 1, the system 200 of FIG. 2, the system 600 of FIG. 6, the system 700 of FIG. 7, the system 800 of FIG. 8, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for securing computer code from tampering, the method comprising:
   receiving, by one or more processors, computer code to be secured, the computer code comprising a plurality of code blocks that are sequentially ordered;
   applying, by the one or more processors, a secure hash function to information associated with a first code block of the plurality of code blocks to produce a first hashed signature corresponding to the first code block, the information associated with the first code block comprising the first code block and additional information associated with the first code block, wherein the additional information associated with the first code block comprises user information associated with a user that authored the first code block, credentials associated with the user that authored the first code block, and security data associated with the first code block or the user;
   inserting, by the one or more processors, the first hashed signature into the first code block to produce a signed first code block;
   applying, by the one or more processors, a secure hash function to information associated with different code blocks of the plurality of code blocks to produce additional hashed signatures,
      wherein the information associated with a particular different code block comprises the different code block, additional information associated with the different code block, and a hashed signature of a prior code block of the plurality of code blocks, the prior code block determined based on the sequential ordering of the plurality of code blocks, and wherein the additional information associated with the different code block comprises user information associated with a user that authored the different code block, credentials associated with the user that authored the different code block, and security data associated with the different code block or the user that authored the different code block; and
   outputting, by the one or more processors, a plurality of hashed signatures.

2. The method of claim 1, wherein outputting the plurality of hashed signatures comprises storing, by the one or more processors, the plurality of hashed signatures at a database.

3. The method of claim 1, wherein outputting the plurality of hashed signatures comprises:
   modifying, by the one or more processors, a particular code block of the plurality of code blocks to produce an updated code block, wherein the modifying is performed subsequent to generating the hashed signature for the particular code block;
   applying the secure hash function to information associated with the updated code block to produce a new hashed signature for the particular code block;
   inserting, by the one or more processors, the new hashed signature into a modified code block to produce a secured code;
   determining whether to update, by the one or more processors, hashed signatures for one or more other code blocks of the plurality of code blocks subsequent to producing the new hashed signature, wherein the one or more other code blocks correspond to code blocks associated with hashed signatures generated based at least in part on the hashed signature of the particular block prior to the modifying, the one or more other code blocks corresponding to code blocks subsequent to the modified code block based on the sequential ordering, wherein any new hashed signatures generated for the one or more other code blocks are inserted into the respective other code blocks to produce secured code; and
   storing, by the one or more processors, the secured code in a code repository.

4. The method of claim 1, wherein generating a second hashed signature of the plurality of hashed signatures comprises applying the secure hash function to a representational value corresponding to a second code block of the plurality of code blocks, additional information associated with the second code block, and the first hashed signature.

5. The method of claim 1, further comprising inserting, by the one or more processors, a function call to the secure hash function as a particular line of code in each code block of the plurality of code blocks.

6. The method of claim 1, further comprising, after generating the hashed signature for each code block of the plurality of code blocks, generating, by the one or more processors, a hashed signature based on a representational value corresponding to an entirety of the computer code, additional information associated with the entirety of the computer code, and the plurality of hashed signatures.

7. The method of claim 1, further comprising:
receiving, by the one or more processors, second computer code to be validated, the second computer code comprising a second plurality of code blocks that are sequentially ordered;
generating, by the one or more processors, a first validation signature based on a representational value corresponding to a last code block of the second plurality of code blocks, additional information associated with the last code block, and a second-to-last hashed signature in the sequential ordering of the plurality of hashed signatures; and
determining, by the one or more processors, whether to issue an alert based on a comparison of the first validation signature and a last hashed signature in the sequential ordering of the plurality of hashed signatures.

8. The method of claim 7, further comprising:
determining, by the one or more processors, not to issue the alert based on the first validation signature matching the last hashed signature; and
outputting, by the one or more processors, validation of the second computer code.

9. The method of claim 7, further comprising:
determining, by the one or more processors, to issue the alert based on the first validation signature failing to match the last hashed signature; and
iteratively performing, by the one or more processors, validation on each code block of the second plurality of code blocks until a determination of a valid code block of the second plurality of code blocks.

10. The method of claim 7, further comprising outputting, by the one or more processors, a validation report based on the second computer code, wherein the validation report includes a plurality of validation signatures, blockwise validation indicators corresponding to the second plurality of code blocks, or a validation indication corresponding to an entirety of the second computer code.

11. A system for securing computer code from tampering, the system comprising:
a memory; and
one or more processors communicatively coupled to the memory, the one or more processors configured to:
receive computer code to be secured, the computer code comprising a plurality of code blocks that are sequentially ordered;
apply a secure hash function to information associated with a first code block of the plurality of code blocks to produce a first hashed signature corresponding to the first code block, the information associated with the first code block comprising the first code block and additional information associated with the first code block, wherein the additional information associated with the first code block comprises user information associated with a user that authored the first code block, credentials associated with the user that authored the different code block, and security data associated with the first code block or the user that authored the different code block;
insert the first hashed signature into the first code block to produce a signed first code block;
apply a secure hash function to information associated with different code blocks of the plurality of code blocks to produce additional hashed signatures, wherein the information associated with a particular different code block comprises the different code block, additional information associated with the different code block, and a hashed signature of a prior code block of the plurality of code blocks, the prior code block determined based on the sequential ordering of the plurality of code blocks, and wherein the additional information associated with the different code block comprises user information associated with a user that authored the different code block, credentials associated with the user that authored the different code block, and security data associated with the different code block or the user that authored the different code block; and
output a plurality of hashed signatures.

12. The system of claim 11, further comprising a database configured to store the plurality of hashed signatures.

13. The system of claim 11, further comprising a network interface communicatively coupled to a code repository, wherein, to output the plurality of hashed signatures, the one or more processors are configured to:
modify a particular code block of the plurality of code blocks to produce an updated code block, wherein the modifying is performed subsequent to generating the hashed signature for the particular code block;
apply the secure hash function to information associated with the updated code block to produce a new hashed signature for the particular code block;
insert the new hashed signature into a modified code block to produce a secured code;
determine whether to update hashed signatures for one or more other code blocks of the plurality of code blocks subsequent to producing the new hashed signature, wherein the one or more other code blocks correspond to code blocks associated with hashed signatures generated based at least in part on the hashed signature of the particular block prior to the modifying, the one or more other code blocks corresponding to code blocks subsequent to the modified code block based on the sequential ordering, wherein any new hashed signatures generated for the one or more other code blocks are inserted into the respective other code blocks to produce secured code; and
send the secured code to the code repository via the network interface.

14. The system of claim 11, wherein the one or more processors are further configured to:
receive second computer code to be validated, the second computer code comprising a second plurality of code blocks that are sequentially ordered;
generate a first validation signature based on a representational value corresponding to a last code block of the second plurality of code blocks, additional information associated with the last code block, and a second-to-last hashed signature in the sequential ordering of the plurality of hashed signatures; and
issue an alert based on the first validation signature not matching a last hashed signature in the sequential ordering of the plurality of hashed signatures.

15. The system of claim 11, wherein the information associated with the first code block comprises a timestamp associated with the first code block.

16. A non-transitory computer-readable storage medium storing instructions that, when executed by one or more processors, cause the one or more processors to perform operations for securing computer code from tampering, the operations comprising:

receiving computer code to be secured, the computer code comprising a plurality of code blocks that are sequentially ordered;

applying a secure hash function to information associated with a first code block of the plurality of code blocks to produce a first hashed signature corresponding to the first code block, the information associated with the first code block comprising the first code block and additional information associated with the first code block, and wherein the additional information associated with the first code block comprises user information associated with a user that authored the first code block, credentials associated with the user that authored the first code block, and security data associated with the first code block or the user that authored the first code block;

inserting the first hashed signature into the first code block to produce a signed first code block;

applying a secure hash function to information associated with different code blocks of the plurality of code blocks to produce additional hashed signatures, wherein the information associated with a particular different code block comprises the different code block, additional information associated with the different code block, and a hashed signature of a prior code block of the plurality of code blocks, the prior code block determined based on the sequential ordering of the plurality of code blocks, and wherein the additional information associated with the different code block comprises user information associated with a user that authored the different code block, credentials associated with the user that authored the different code block, and security data associated with the different code block or the user that authored the different code block; and outputting a plurality of hashed signatures.

17. The non-transitory computer-readable storage medium of claim 16, wherein generating a second hashed signature of the plurality of hashed signatures comprises applying the secure hash function to a representational value corresponding to a second code block of the plurality of code blocks, additional information associated with the second code block, and the first hashed signature.

18. The non-transitory computer-readable storage medium of claim 16, wherein the operations further comprise inserting a function call to the secure hash function as a particular line of code in each code block of the plurality of code blocks.

19. The non-transitory computer-readable storage medium of claim 16, wherein the operations further comprise, after generating the hashed signature for each code block of the plurality of code blocks, generating a hashed signature based on a representational value corresponding to an entirety of the computer code, additional information associated with the entirety of the computer code, and the plurality of hashed signatures.

* * * * *

UNITED STATES PATENT AND TRADEMARK OFFICE
CERTIFICATE OF CORRECTION

PATENT NO. : 12,284,269 B2  
APPLICATION NO. : 17/558171  
DATED : April 22, 2025  
INVENTOR(S) : J T Kostman et al.

Page 1 of 1

It is certified that error appears in the above-identified patent and that said Letters Patent is hereby corrected as shown below:

In the Claims

At Column 36, Claim number 1, Line number 6, delete "the user;" and replace with --the user that authored the first code block;--.
At Column 38, Claim number 11, Line number 1, delete "authored the different code block" and replace with --authored the first code block--.
At Column 38, Claim number 11, Line number 3, delete "authored the different code block" and replace with --authored the first code block--.

Signed and Sealed this  
Twenty-seventh Day of May, 2025

Coke Morgan Stewart  
*Acting Director of the United States Patent and Trademark Office*